(12) United States Patent
Wang et al.

(10) Patent No.: US 8,649,084 B2
(45) Date of Patent: Feb. 11, 2014

(54) COLOR DISPLAY DEVICES

(75) Inventors: Xiaojia Wang, Fremont, CA (US);
Craig Lin, San Jose, CA (US); Robert Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 17 days.

(21) Appl. No.: 13/225,184

(22) Filed: Sep. 2, 2011

(65) Prior Publication Data
US 2013/0057942 A1    Mar. 7, 2013

(51) Int. Cl.
*G02B 26/00* (2006.01)

(52) U.S. Cl.
USPC ............................................... 359/296

(58) Field of Classification Search
USPC .......................................... 359/296; 345/107
See application file for complete search history.

(56) References Cited

U.S. PATENT DOCUMENTS

| | | | |
|---|---|---|---|
| 3,756,693 A * | 9/1973 | Ota | ................... 345/107 |
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,525,866 B1 | 2/2003 | Lin et al. | |
| 6,538,801 B2 | 3/2003 | Jacobson et al. | |
| 6,600,534 B1 | 7/2003 | Tanaka et al. | |
| 6,650,462 B2 | 11/2003 | Katase | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 * | 6/2004 | Liang et al. | ................... 359/296 |
| 6,829,078 B2 | 12/2004 | Liang et al. | |
| 6,864,875 B2 | 3/2005 | Drzaic et al. | |
| 7,009,756 B2 | 3/2006 | Kishi et al. | |
| 7,038,655 B2 | 5/2006 | Herb et al. | |
| 7,038,670 B2 | 5/2006 | Liang et al. | |
| 7,046,228 B2 | 5/2006 | Liang et al. | |
| 7,050,218 B2 | 5/2006 | Kanbe | |
| 7,057,600 B2 | 6/2006 | Goden | |
| 7,075,502 B1 | 7/2006 | Drzaic et al. | |
| 7,226,550 B2 | 6/2007 | Hou et al. | |
| 7,271,947 B2 | 9/2007 | Liang et al. | |

(Continued)

FOREIGN PATENT DOCUMENTS

| | | |
|---|---|---|
| EP | 1 089 118 | 4/2001 |
| JP | 2004-020818 | 6/2002 |

(Continued)

OTHER PUBLICATIONS

U.S. Appl. No. 13/092,052, filed Apr. 21, 2011, Sprague et al.

(Continued)

*Primary Examiner* — Tuyen Tra
(74) *Attorney, Agent, or Firm* — Perkins Coie LLP

(57) ABSTRACT

The present invention is directed to a color display comprising an electrophoretic fluid comprising two types of pigment particles of contrasting colors and carrying opposite charge polarities dispersed in a clear and colorless solvent, wherein said electrophoretic fluid is sandwiched between a common electrode and a plurality of colored sub-pixel electrodes or colored pixel electrodes.

11 Claims, 31 Drawing Sheets

(56) References Cited

U.S. PATENT DOCUMENTS

| | | | |
|---|---|---|---|
| 7,283,199 B2 | 10/2007 | Aichi et al. | |
| 7,342,556 B2 * | 3/2008 | Oue et al. | 345/33 |
| 7,365,732 B2 | 4/2008 | Matsuda et al. | |
| 7,411,719 B2 | 8/2008 | Paolini et al. | |
| 7,417,787 B2 | 8/2008 | Chopra et al. | |
| 7,545,557 B2 | 6/2009 | Iftime et al. | |
| 7,548,291 B2 | 6/2009 | Lee et al. | |
| 7,557,981 B2 | 7/2009 | Liang et al. | |
| 7,679,599 B2 | 3/2010 | Kawai | |
| 7,760,419 B2 * | 7/2010 | Lee | 359/296 |
| 7,830,592 B1 | 11/2010 | Sprague et al. | |
| 7,852,547 B2 | 12/2010 | Kim | |
| 7,852,548 B2 | 12/2010 | Roh | |
| 7,982,941 B2 | 7/2011 | Lin et al. | |
| 8,072,675 B2 | 12/2011 | Lin et al. | |
| 8,115,729 B2 | 2/2012 | Danner et al. | |
| 8,120,838 B2 | 2/2012 | Lin et al. | |
| 8,159,636 B2 | 4/2012 | Sun et al. | |
| 8,237,892 B1 | 8/2012 | Sprague et al. | |
| 8,395,836 B2 | 3/2013 | Lin et al. | |
| 8,466,852 B2 | 6/2013 | Drzaic et al. | |
| 2002/0033792 A1 | 3/2002 | Inoue | |
| 2002/0171620 A1 | 11/2002 | Gordon et al. | |
| 2003/0002132 A1 | 1/2003 | Foucher et al. | |
| 2003/0095094 A1 | 5/2003 | Goden | |
| 2003/0107631 A1 | 6/2003 | Goto et al. | |
| 2003/0132908 A1 | 7/2003 | Herb et al. | |
| 2004/0051935 A1 | 3/2004 | Katase | |
| 2004/0113884 A1 | 6/2004 | Albert et al. | |
| 2004/0136048 A1 | 7/2004 | Arango et al. | |
| 2004/0190115 A1 | 9/2004 | Liang et al. | |
| 2004/0252361 A1 | 12/2004 | Machida et al. | |
| 2004/0263947 A1 | 12/2004 | Drzaic et al. | |
| 2005/0151709 A1 | 7/2005 | Jacobson et al. | |
| 2005/0190431 A1 | 9/2005 | Matsuda | |
| 2006/0197738 A1 | 9/2006 | Kawai | |
| 2006/0245060 A1 | 11/2006 | Goto | |
| 2007/0002008 A1 | 1/2007 | Tam | |
| 2007/0080928 A1 | 4/2007 | Ishii et al. | |
| 2007/0268556 A1 | 11/2007 | Chopra et al. | |
| 2007/0273637 A1 | 11/2007 | Zhou et al. | |
| 2008/0042928 A1 | 2/2008 | Schlangen et al. | |
| 2008/0174531 A1 | 7/2008 | Sah | |
| 2009/0034054 A1 | 2/2009 | Ikegami et al. | |
| 2009/0213452 A1 | 8/2009 | Lin et al. | |
| 2009/0251763 A1 | 10/2009 | Sprague et al. | |
| 2009/0273827 A1 | 11/2009 | Lin et al. | |
| 2010/0103502 A1 | 4/2010 | Jacobson et al. | |
| 2010/0165005 A1 | 7/2010 | Sprague | |
| 2010/0165448 A1 | 7/2010 | Sprague | |
| 2011/0102313 A1 | 5/2011 | Hsieh et al. | |
| 2011/0217639 A1 | 9/2011 | Sprague | |
| 2012/0007897 A1 * | 1/2012 | Yang et al. | 345/690 |
| 2012/0307346 A1 | 12/2012 | Sprague | |
| 2013/0057463 A1 | 3/2013 | Zhang et al. | |

FOREIGN PATENT DOCUMENTS

| | | |
|---|---|---|
| JP | 2008-033335 | 2/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/115,899, filed May 25, 2011, Lin.
U.S. Appl. No. 13/370,186, filed Feb. 9, 2012, Wang et al.
U.S. Appl. No. 13/371,293, filed Feb. 10, 2012, Zhang et al.
U.S. Appl. No. 13/551,541, filed Jul. 17, 2012, Yang et al.
U.S. Appl. No. 13/633,788, filed Oct. 2, 2012, Wang et al.
U.S. Appl. No. 13/875,145, filed May 1, 2013, Wang et al.

* cited by examiner

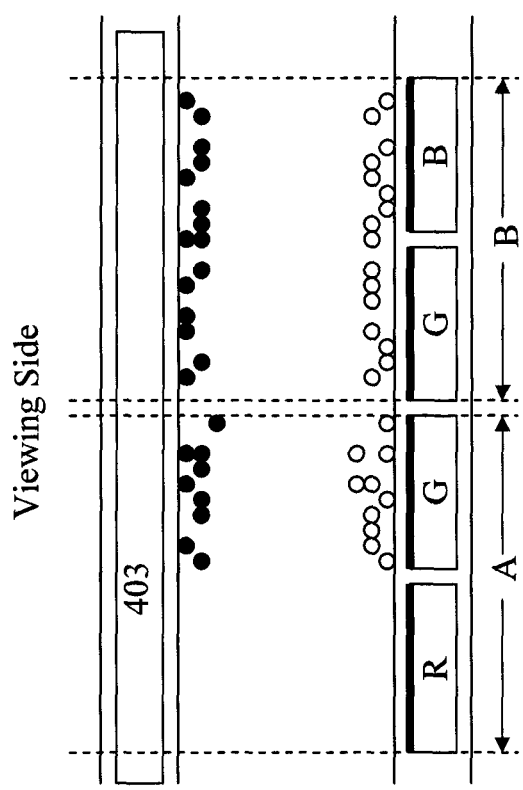

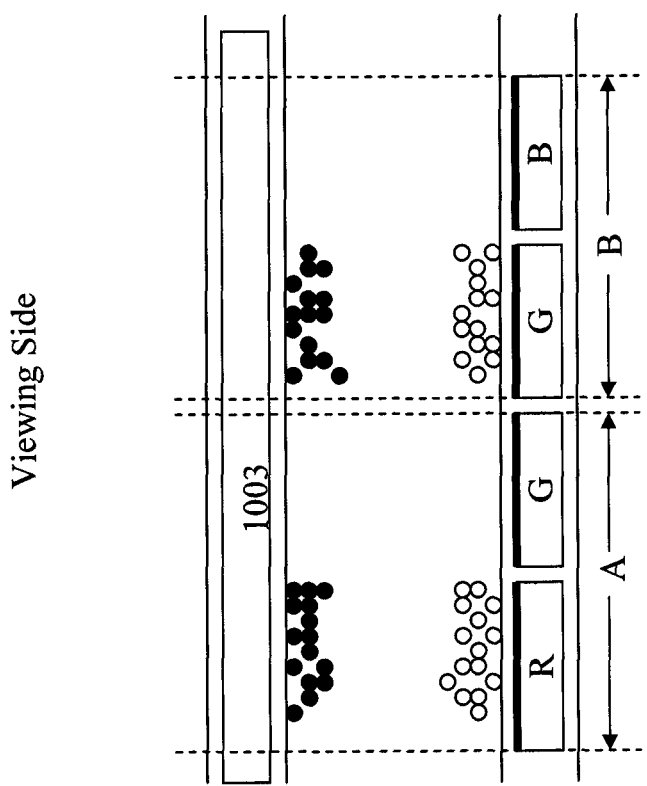

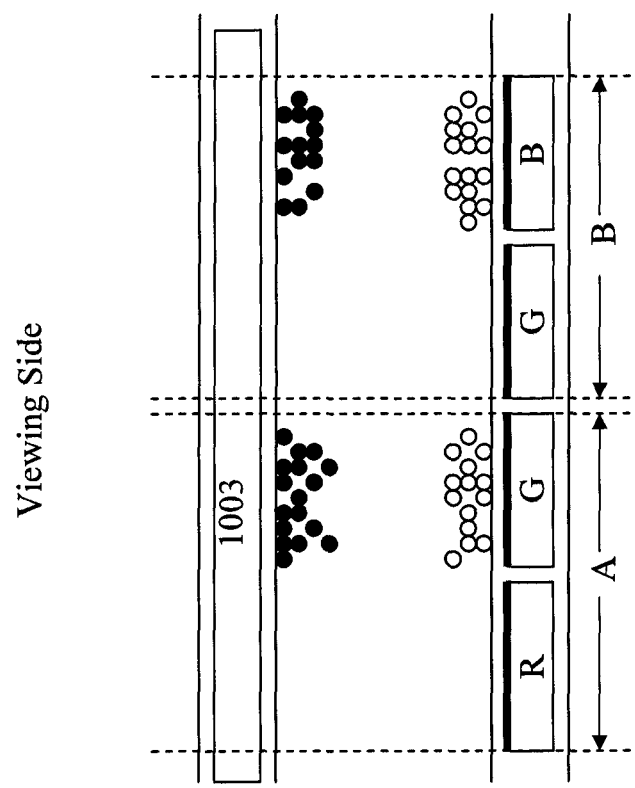

(e)

COLOR DISPLAY DEVICES

FIELD OF THE INVENTION

The present invention is directed to display devices which are capable of displaying multiple color states.

BACKGROUND OF THE INVENTION

U.S. Pat. No. 7,046,228 discloses an electrophoretic display device having a dual switching mode which allows the charged pigment particles in a display cell to move in either the vertical (up/down) direction or the planar (left/right) direction. In such a display device, each of the display cells is sandwiched between two layers, one of which comprises a transparent top electrode, whereas the other layer comprises a bottom electrode and at least one in-plane electrode. Typically, the display cells are filled with a clear, but colored dielectric solvent or solvent mixture with charged white pigment particles dispersed therein. The background color of the display cells may be black. When the charged pigment particles are driven to be at or near the transparent top electrode, the color of the particles is seen, from the top viewing side. When the charged pigment particles are driven to be at or near the bottom electrode, the color of the solvent is seen. When the charged pigment particles are driven to be at or near the in-plane electrode(s), the color of the display cell background is seen. Accordingly, each of the display cells is capable of displaying three color states, i.e., the color of the charged pigment particles, the color of the dielectric solvent or solvent mixture or the background color of the display cell. The dual mode electrophoretic display, according to the patent, may be driven by an active matrix system or by a passive matrix system.

When this dual mode scheme is used for a full color display application, each pixel will have three individual display cells that contain a white particle dispersion in a red, green or blue colored solvent, respectively, and each display cell must be aligned with a set of electrodes on a backplane. The alignment accuracy between the red/green/blue display cells and the electrodes on the backplane is important in order to achieve good color performance.

There are several later filed US patent applications (e.g., U.S. patent application Ser. Nos. 12/432,519, 12/416,827, 12/644,888, 12/644,861 & 12/547,351) which disclose color display devices, in some of which the electrodes on the backplane may be aligned or un-aligned with the display cells.

SUMMARY OF THE INVENTION

The display architecture of the present invention comprises (1) an electrophoretic film in which an electrophoretic fluid comprises two types of pigment particles of contrasting colors and carrying opposite charge polarities, dispersed in an optically clear solvent, and (2) a backplane with reflective colors associated with individual sub-pixel or pixel electrodes. This display architecture offers two basic operation modes, the white/black mode and the color mode.

The operation of the white/black mode is similar to the operation of a standard electrophoretic display with white and black states created by moving the white or black particles to the viewing side. When operating in this mode, particles can gather at either the common electrode or the pixel electrodes to show the white or black colors.

The operation of the color mode moves the white and black particles away to expose the color layers. In addition, the white and black particles that are moved aside can be arranged to show a specific gray level to complement the exposed color to meet the color chromaticity and brightness requirement.

The white/black mode and the color mode can be combined to deliver richer or brighter color images.

The number of sub-pixels and the color associated with each of the sub-pixel electrodes may vary with application. For a full color application, a design with a minimum of two sub-pixels per pixel is needed. For a highlight color application having black/white plus a single color (e.g., red, green or blue), there is no need for sub-pixels in a pixel.

The first aspect of the present invention is directed to a color display which comprises (1) an electrophoretic fluid comprising two types of pigment particles of contrasting colors and carrying opposite charge polarities dispersed in a clear and colorless solvent, and (2) a plurality of pixels, wherein:

a) each of said pixels comprises two sub-pixels, b) each of said sub-pixels is sandwiched between a common electrode and at least two colored sub-pixel electrodes, and c) among the four sub-pixel electrodes at least one is red, one is green and one is blue.

In this aspect of the invention, the two types of pigment particles are black and white respectively. In one embodiment, the sub-pixel electrodes are rectangular or square. In one embodiment, the sub-pixel electrodes are of an irregular shape. In one embodiment, the sub-pixel electrodes are coated with a colored layer. In one embodiment, the sub-pixel electrodes are on a thin film transistor backplane. In one embodiment, the electrophoretic fluid is contained within individual display cells. In one embodiment, the display cells are microcups. In one embodiment, the display cells are microcapsules. In one embodiment, the display cells and the sub-pixel electrodes are aligned. In one embodiment, the display cells and the sub-pixel electrodes are unaligned. In one embodiment, each pixel comprises more than four sub-pixel electrodes.

The second aspect of the invention is directed to a color display which comprises (1) an electrophoretic fluid comprising two types of pigment particles of contrasting colors and carrying opposite charge polarities dispersed in a clear and colorless solvent, and a plurality of pixels, wherein:

a) each of said pixels is sandwiched between a common electrode and at least three colored pixel electrodes, and b) among the three pixel electrodes one is red, one is green and one is blue.

In this second aspect of the invention, the two types of pigment particles are black and white respectively. In one embodiment, the pixel electrodes are rectangular or square. In one embodiment, the pixel electrodes are of an irregular shape. In one embodiment, the pixel electrodes are coated with a colored layer. In one embodiment, the pixel electrodes are on a thin film transistor backplane. In one embodiment, the electrophoretic fluid is contained within individual display cells. In one embodiment, the display cells are microcups. In one embodiment, the display cells are microcapsules. In one embodiment, the display cells and the pixel electrodes are aligned. In one embodiment, the display cells and the pixel electrodes are unaligned. In one embodiment, each pixel comprises more than three pixel electrodes.

The third aspect of the invention is directed to a color display which comprises (1) an electrophoretic fluid comprising two types of pigment particles of contrasting colors and carrying opposite charge polarities dispersed in a clear and colorless solvent, and (2) a plurality of pixels, wherein:

a) each of said pixels is sandwiched between a common electrode and two colored pixel electrodes, and b) the two colored pixel electrodes are of the same color.

In this third aspect of the invention, the two types of pigment particles are black and white respectively. In one embodiment, the pixel electrodes are rectangular or square. In one embodiment, the pixel electrodes are of an irregular shape. In one embodiment, the pixel electrodes are coated with a colored layer. In one embodiment, the pixel electrodes are on a thin film transistor backplane. In one embodiment, the electrophoretic fluid is contained within individual display cells. In one embodiment, the display cells are microcups. In one embodiment, the display cells are microcapsules. In one embodiment, the display cells and the pixel electrodes are aligned. In one embodiment, the display cells and the pixel electrodes are unaligned.

The fourth aspect of the present invention is directed to a driving method for a color display which comprises an electrophoretic fluid comprising white and black pigment particles carrying opposite charge polarities and dispersed in a clear and colorless solvent, wherein said electrophoretic fluid is sandwiched between a common electrode and a plurality of colored sub-pixel or pixel electrodes, which method comprises:

a) applying a constant driving voltage between the common electrode and the sub-pixel or pixel electrode where the pigment particles are to be gathered; and b) applying alternating positive driving voltage and negative driving voltage between the common electrode and the sub-pixel or pixel electrode which are to be exposed.

In one embodiment, the constant driving voltage in step (a) is 0V.

The color display of the present invention provides many advantages. For example, there is no need for precision display cell structure. In other words, there is no need to match the size of the display cells with the size of the electrodes on the backplane. There is also no need for precise alignment between the display cells and the electrodes on the backplane, position wise. In addition, no colorants are needed to be dissolved or dispersed in the solvent in which the pigment particles are dispersed.

BRIEF DESCRIPTION OF THE DRAWINGS

FIGS. 2a-2b and 3a-3b illustrate different types of sub-pixel or pixel electrodes.

FIGS. 4a-4e illustrate how a color display of FIG. 1a may display different color states.

FIGS. 10a-10c illustrate how a color display of FIG. 1a may display cyan, magenta or yellow color state.

DETAILED DESCRIPTION OF THE INVENTION

Figure 1A:
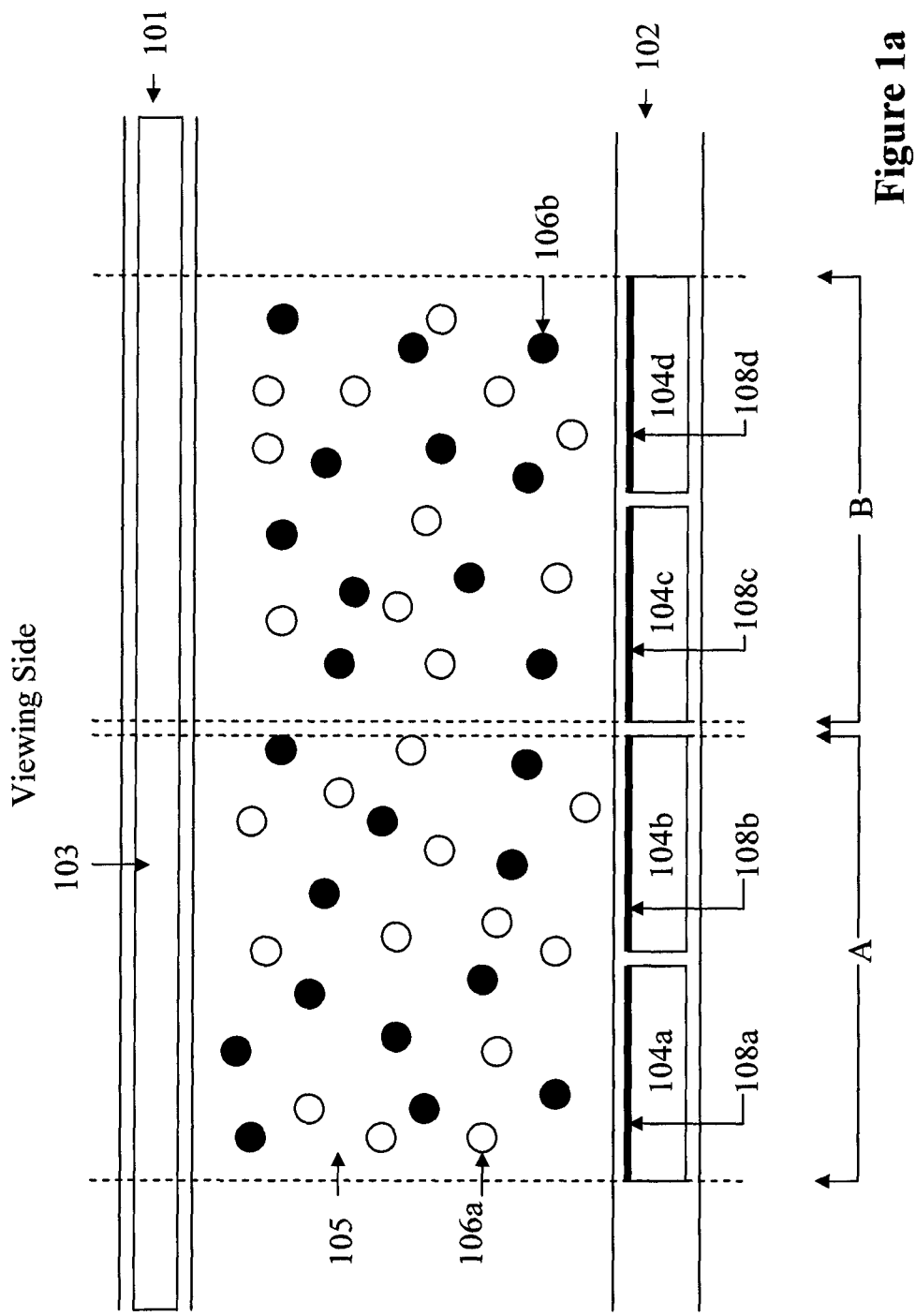
FIGS. 1a, 1b and 1c depict examples of the present invention.

FIG. 1a depicts one embodiment of the present invention which is applicable to a full color display. In this design two sub-pixels (A and B) form a pixel. A display fluid (105) is sandwiched between a first layer (101) and a second layer (102). The first layer comprises a common electrode (103). In sub-pixel A, the second layer comprises two sub-pixel electrodes (104a and 104b) and in sub-pixel B, the second layer comprises two sub-pixel electrodes (104c and 104d).

In FIG. 1a and throughout this application in drawings, the dotted lines indicate a sub-pixel or a pixel.

The display fluid (105) may be an electrophoretic fluid comprising two types of pigment particles (106a and 106b), e.g., black and white, carrying charges of opposite polarities. The solvent in the display fluid is clear and colorless.

The sub-pixel electrodes are colored. For example, each of the sub-pixel electrodes may have a colored layer (108a-d, respectively) attached to it. The colored layer may be a color filter material or a colored adhesive material. Such a colored layer may be coated or laminated onto the sub-pixel electrodes when a single color is applied to all sub-pixel electrodes. When more than one color is needed, the color pattern may be printed or deposited, using, for example, a laser thermal transfer, ink jet or photo-patterning technique, on to different sub-pixel electrodes.

The colored layers (108a-d) may be on top of the sub-pixel electrodes (as shown) or underneath the sub-pixel electrodes (not shown) if the sub-pixel electrodes are transparent.

The colored layer provides color to the sub-pixel electrode. For example, in this application, a sub-pixel electrode which has a red colored layer attached to it is referred to as a red sub-pixel electrode.

It is also possible to have more than four sub-pixel electrodes in a pixel in this design, in order to enhance color brightness or color saturation. For the additional sub-pixel electrodes, they may be white, black or of another color.

Figure 1B:
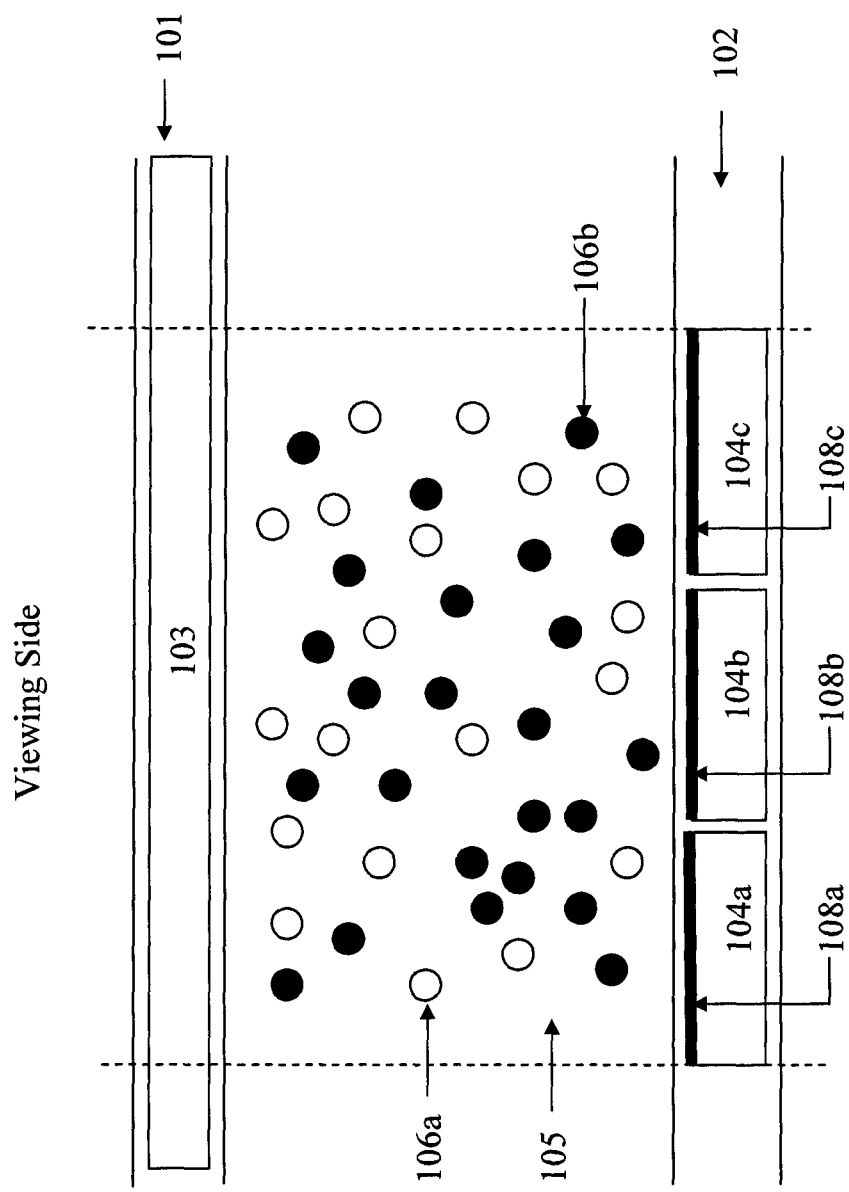

FIG. 1b is an alternative design of the present invention which is also applicable to a full color display. In this design, a display fluid (105) is also sandwiched between a first layer (101) comprising a common electrode (103) and a second layer (102). In this alternative design, there is only one pixel and the second layer for the pixel comprises three pixel electrodes (104a, 104b and 104c). Each of the pixel electrodes (104a-c) also has a colored layer (108a-c, respectively) attached to it.

It is also possible to have more than three pixel electrodes in a pixel in this design, in order to enhance color brightness or color saturation. For the additional pixel electrodes, they may be white, black or of another color.

Figure 1C:
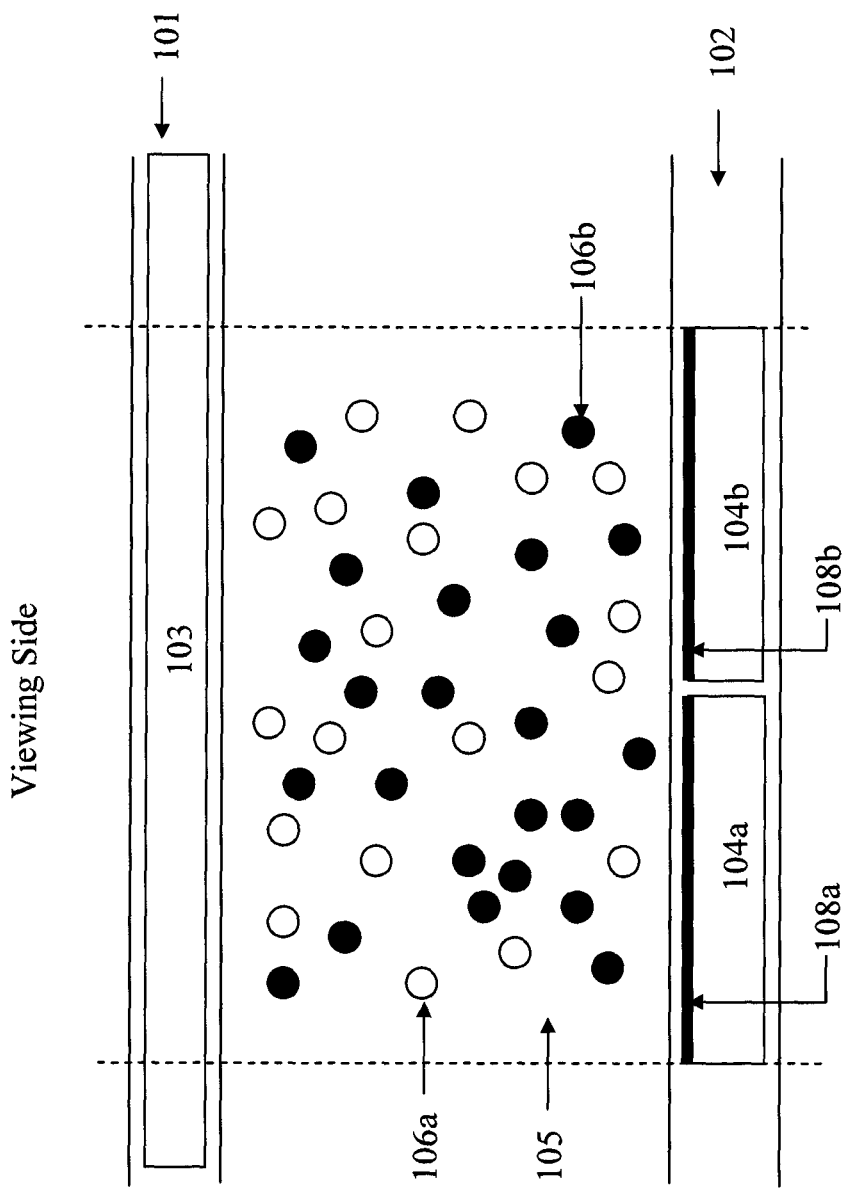

FIG. 1c is a further alternative design of the present invention which is applicable to a highlight color display. In this design, a display fluid (105) is also sandwiched between a first layer (101) comprising a common electrode (103) and a second layer (102). In this alternative design, a pixel comprises two pixel electrodes (104a and 104b) of the same color. In other words, the colored layers 108a and 108b are of the same color.

The description above of the display fluid and the colored layer for the color display of FIG. 1a is also applicable to the color displays of FIGS. 1b and 1c.

The sizes of the sub-pixel electrodes (in FIG. 1a) or pixel electrodes (in FIG. 1b or 1c) on the same second layer may be the same or different, depending on the design needs. This is further discussed in a section below.

Figure 2:
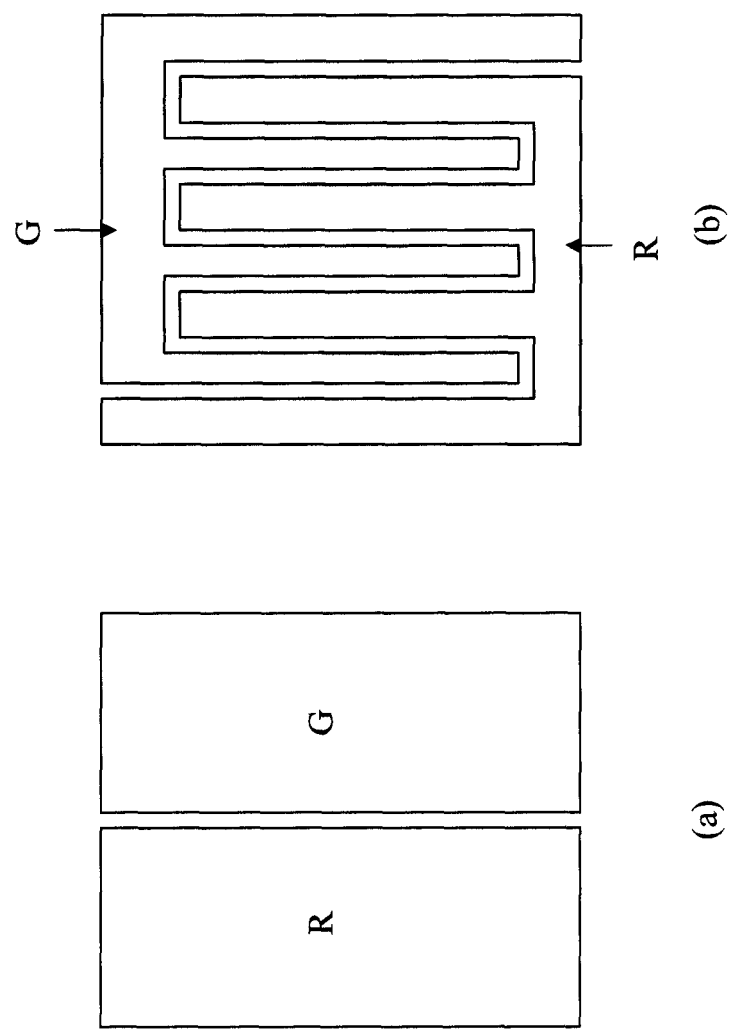
Figure 3:
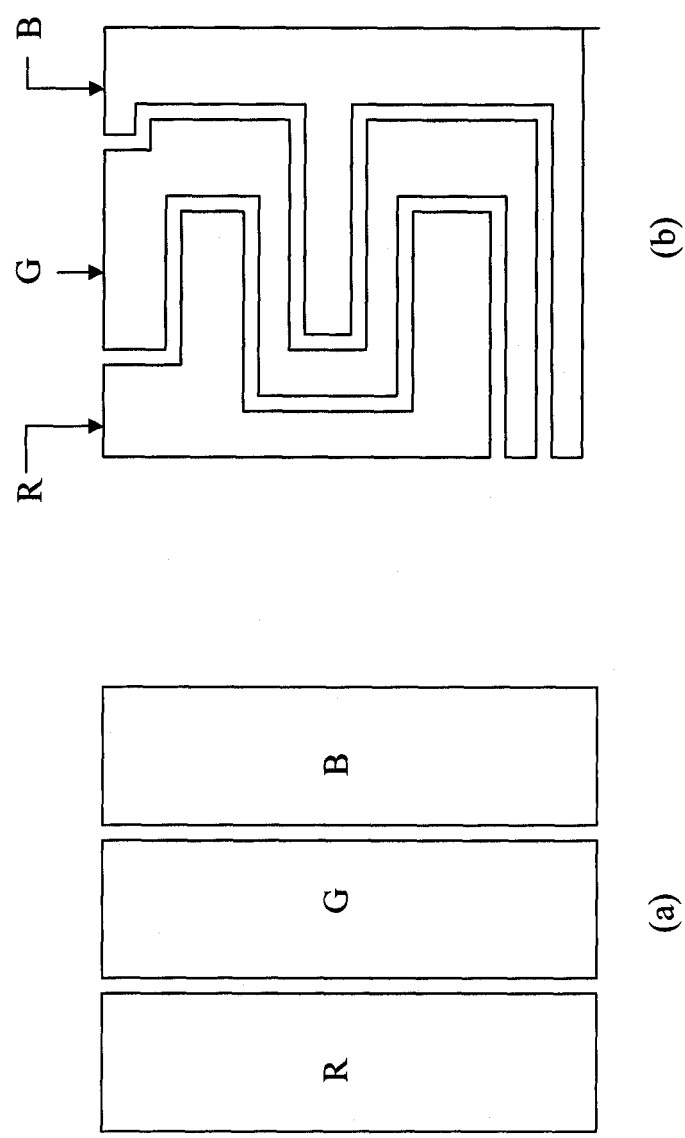
FIGS. 16-1 to 16-3 illustrate how an unaligned design of FIG. 15 may display different color states.

The shapes of the sub-pixel electrodes or pixel electrodes may also vary, as long as they serve the desired functions. For example, the sub-pixel electrodes or pixel electrodes may be rectangular in shape, as shown in FIGS. 2a and 3a, which show the top view of a second layer. FIG. 2a shows two sub-pixel electrodes for a sub-pixel (for, for example, the design of FIG. 1a) and FIG. 3a shows three pixel electrodes for a pixel (for, for example, the design of FIG. 1b), on the second layer.

In a further embodiment of the present invention, the sub-pixel electrodes may be configured in a manner in order to increase the speed of image transition. FIGS. 2b and 3b depict such alternative designs. In FIG. 2b, the two sub-pixel electrodes (red and green) for a sub-pixel are configured to be interlocked, but not in contact with each other. In FIG. 3b, there are three pixel electrodes (red, green and blue) for a pixel, in a configuration similar to that of FIG. 2b. The irregular shaped sub-pixel or pixel electrodes in FIGS. 2b and 3b provide the benefit that the charged pigment particles would travel a shorter distance to the desired location, thus increasing the speed of image transition.

The term "irregular-shaped", in the context of the present invention, refers to a sub-pixel or pixel electrode of any shape, except rectangle or square, which can provide a shorter distance for the charged pigment particles to travel to a desired location.

It is understood that the term "irregular-shaped" pixel electrode not only encompasses a sub-pixel or pixel electrode which is in one piece (i.e., its component pieces are both physically and electrically connected), but also encompasses a sub-pixel or pixel electrode which is divided into pieces (physically unconnected) and the pieces are electrically connected, as long as the overall shape of the pixel electrode will provide a shorter distance for the charged pigment particles to travel. In the latter case, it is noted that the separate pieces referred to can be of a rectangle, a square or of an irregular shape.

The common electrode (103) in designs of FIGS. 1a-1c is usually a transparent electrode layer (e.g., ITO), spreading over the entire top of the display device. The sub-pixel and pixel electrodes (104) are described in U.S. Pat. No. 7,046,228, the content of which is incorporated herein by reference in its entirety.

It is noted that while active matrix driving with a thin film transistor (TFT) backplane is mentioned for the second layer (102), the scope of the present invention encompasses other types of electrode addressing as long as the electrodes serve the desired functions.

The term "color" referred to in this application may be a single color, a mid-tone color or a composite color.

FIGS. 4a-4e illustrate how the color display of FIG. 1a may display different color states.

For the purpose of illustration, it is assumed that the pixel has two sub-pixels, A and B. In sub-pixel A, there are one red sub-pixel electrode and one green sub-pixel electrode and in sub-pixel B, there are one green sub-pixel electrode and one blue sub-pixel electrode. The solvent in the display fluid is clear and colorless, the white pigment particles are positively charged and the black particles are negatively charged. The side of the first layer is the viewing side.

Figure 4A:
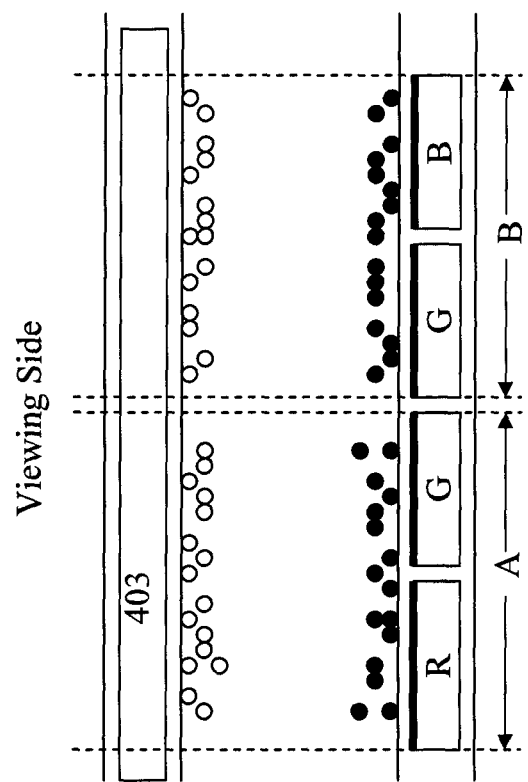

In FIG. 4a, when the common electrode (403) is applied a lower voltage potential than the four sub-pixel electrodes, the white particles would move to be near or at the common electrode while the black particles would move to be near or at the sub-pixel electrodes. As a result, a white color state is seen at the viewing side.

Figure 4B:
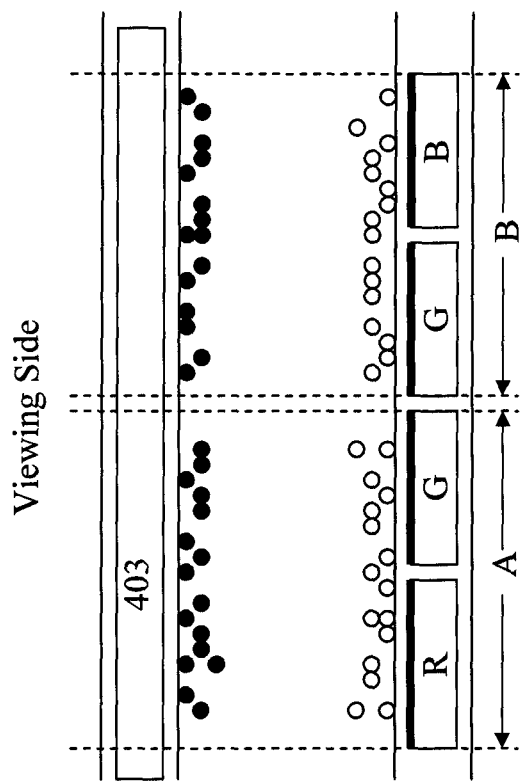

In FIG. 4b, when the common electrode (403) is applied a higher voltage potential than the four sub-pixel electrodes, the white particles would move to be near or at the sub-pixel electrodes while the black particles would move to be near or at the common electrode. As a result, a black color state is seen at the viewing side.

In FIG. 4c, for sub-pixel A, the voltages applied to the common electrode (403) and the two sub-pixel electrodes are set at such that the red sub-pixel electrode would be exposed, and for sub-pixel B, the voltages applied to the common electrode (403) and the two pixel electrodes are set at such that the black particles would move to be near or at the common electrode (403) and the white particles would move to be near or at the two sub-pixel electrodes. As a result, the red color is seen at the viewing side.

One of the key features of the color display of the present invention is to utilize an adjacent sub-pixel or pixel electrode (in this case, the green sub-pixel electrode in sub-pixel A as a collecting electrode for the particles that need to be moved away to gather, in order to expose the desired color of a sub-pixel or pixel electrode (in this case, the red sub-pixel electrode in sub-pixel A).

Figure 4D:
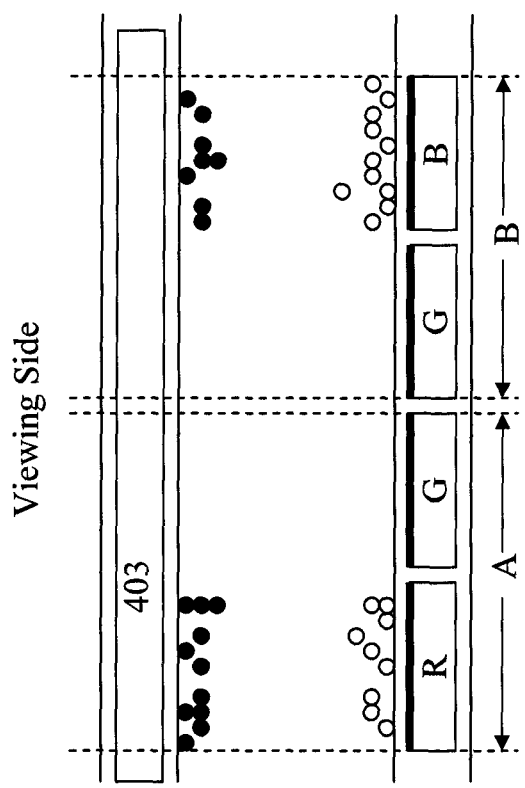

In FIG. 4d, for sub-pixel A, the voltages applied to the common electrode (403) and the two sub-pixel electrodes are set at such that the green sub-pixel electrode would be exposed, and for sub-pixel B, the voltages applied to the common electrode (403) and the two pixel electrodes are set at such that the green sub-pixel electrode would also be exposed. As a result, the green color is seen at the viewing side.

It is also possible to expose only one green sub-pixel electrode (in sub-pixel A or sub-pixel B). However, in that case, the green color would not be as bright.

Figure 4E:
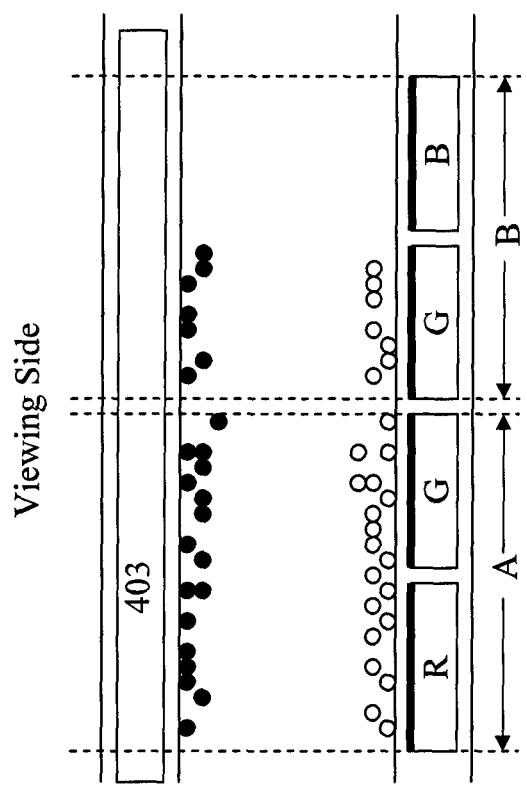

In FIG. 4e, for sub-pixel A, the voltages applied to the common electrode (403) and the two pixel electrodes are set at such that the black particles would move to be near or at the common electrode while the white particles would move to be near or at both sub-pixel electrodes, and for sub-pixel B, the voltages applied to the common electrode (403) and the two sub-pixel electrodes are set at such that the blue pixel electrode is exposed. As a result, the blue color is seen at the viewing side.

In FIGS. 4c-4e, the black particles are shown at the top and the white particles at the bottom. It is possible to have the white particles at the top and the black particles at the bottom. However for color saturation, it is preferred to have the black particles at the top.

FIGS. 5a-5d show different scenarios and demonstrate how the intensity of a color displayed may be adjusted and controlled. In this example, only one sub-pixel is shown for illustration purpose.

Figure 5:
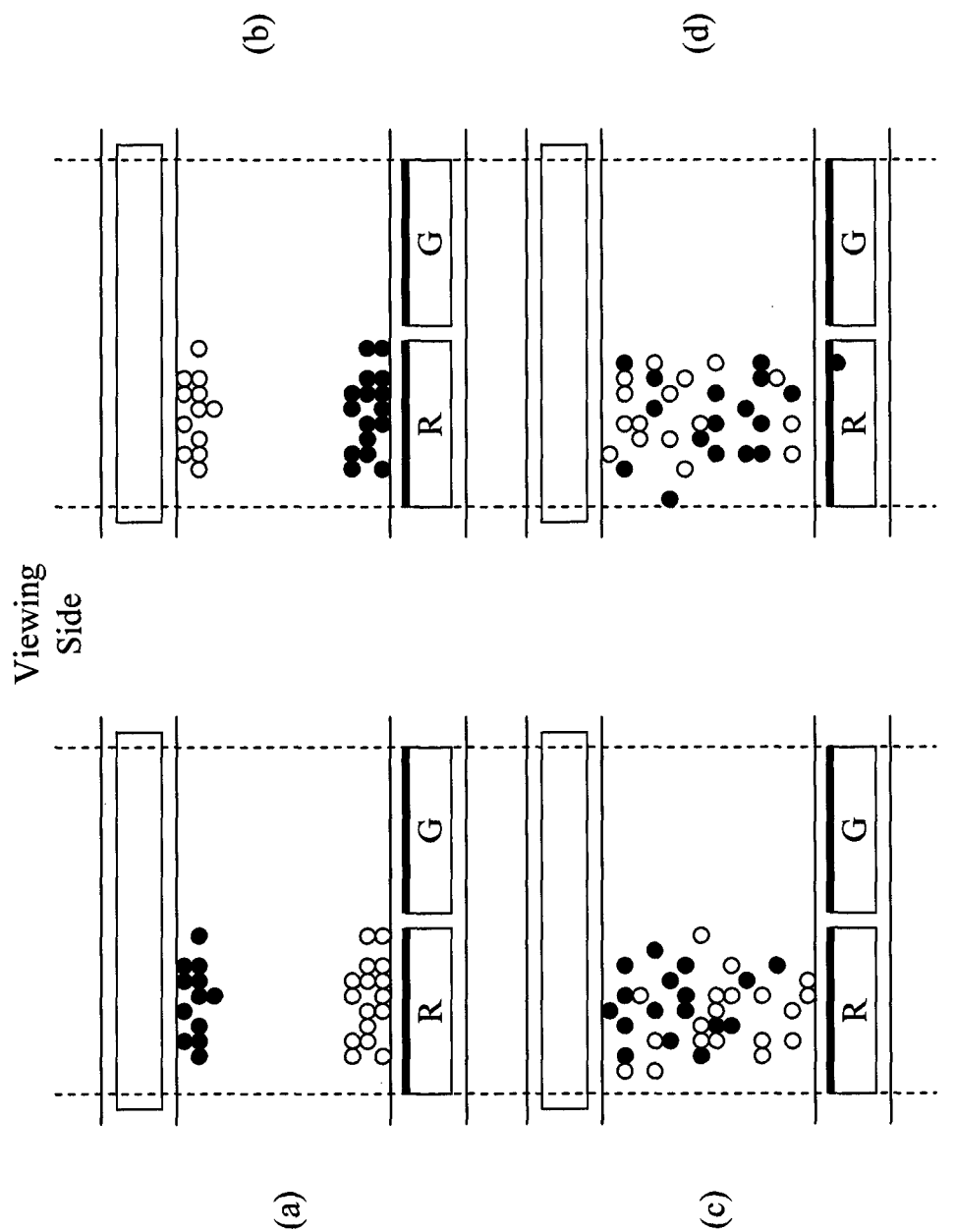
FIGS. 5a-5d show different scenarios and illustrate how the intensity of the color displayed may be adjusted and controlled.
Figure 6:
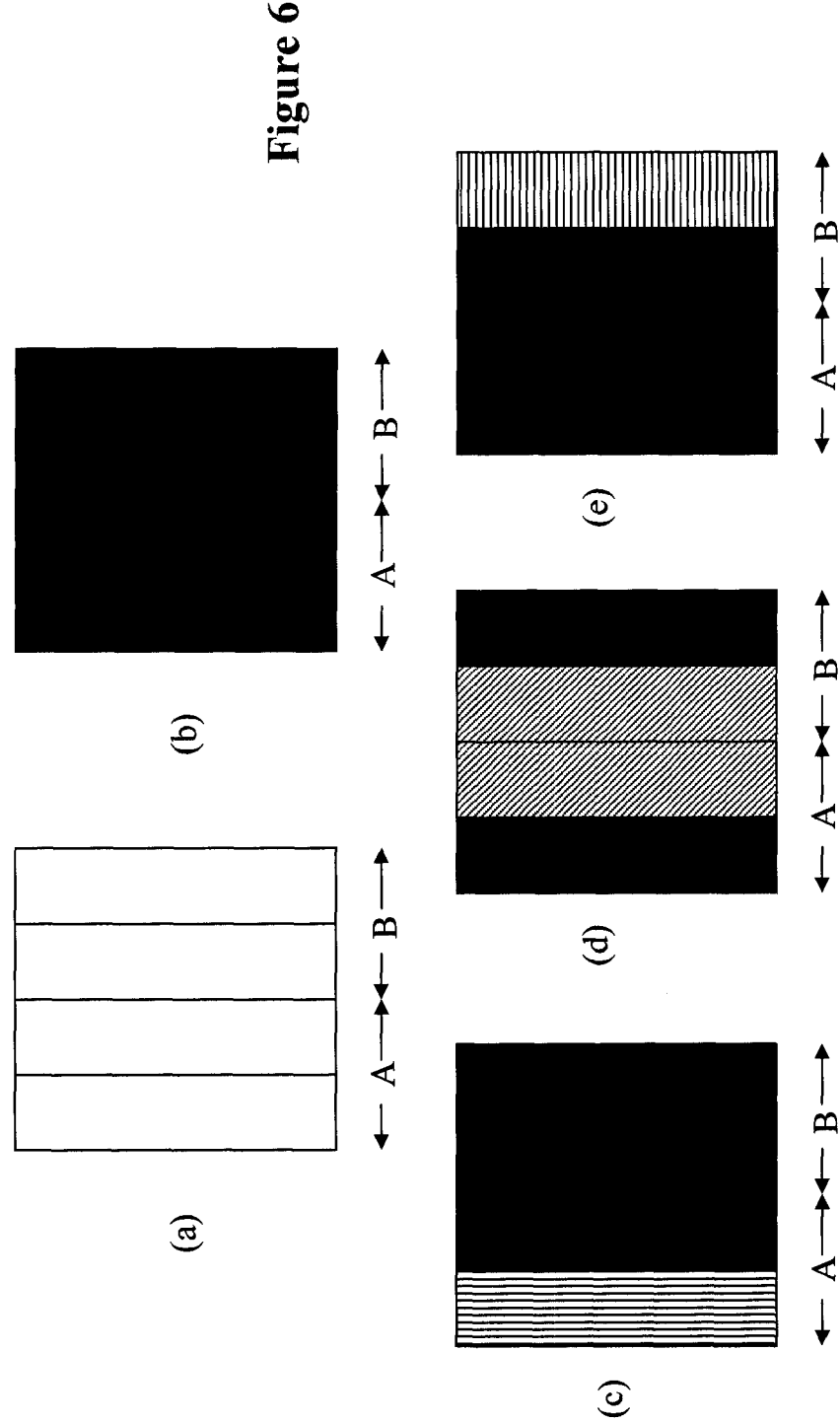
FIGS. 6a-6e are the top view showing the colors seen at the viewing side of the pixel in FIGS. 4a-4e, respectively.

In FIG. 5a, the black particles are at the top and as a result, the green color displayed would be more intense (i.e., more saturated). In FIG. 5b, the white particles are at the top and as a result, the green color displayed would be brighter. In FIG. 5c, voltages are applied in a manner to cause the black and white particles randomly dispersed in one side of the fluid but with more black particles on the top and as a result, the darker grey color would cause the green color to be less intense than that in FIG. 5a but more intense than that in FIG. 5b. In FIG. 5d, voltages are applied in a manner to cause the black and white particles randomly dispersed in one side of fluid but with more white particles on the top and as a result, the less grey color would cause the green color to be less intense than that in FIGS. 5a and 5c but more intense than that in FIG. 5b.

FIGS. 6a-6e is the top view showing the colors seen at the viewing side of the pixel comprising two sub-pixels, in FIGS. 4a-4d, respectively.

FIGS. 7a-7e illustrate how a color display of FIG. 1b may display different color states.

For illustration purpose, the white pigment particles are positively charged and the black pigment particles are negatively charged. The two types of pigment particles are dispersed in a clear and colorless solvent.

Figure 7:
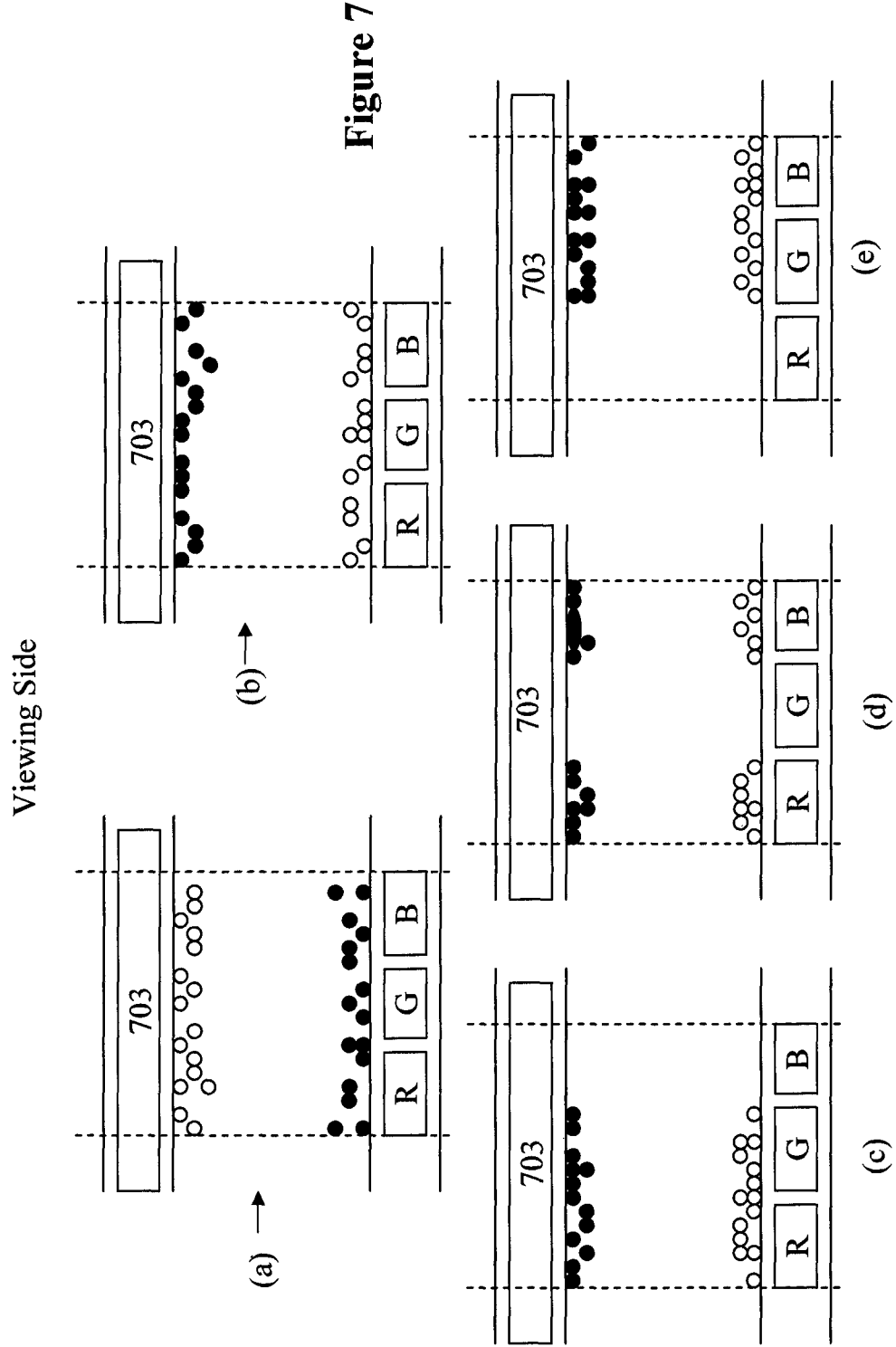
FIGS. 7a-7e illustrate how a color display of FIG. 1b may display different color states.
Figure 8:
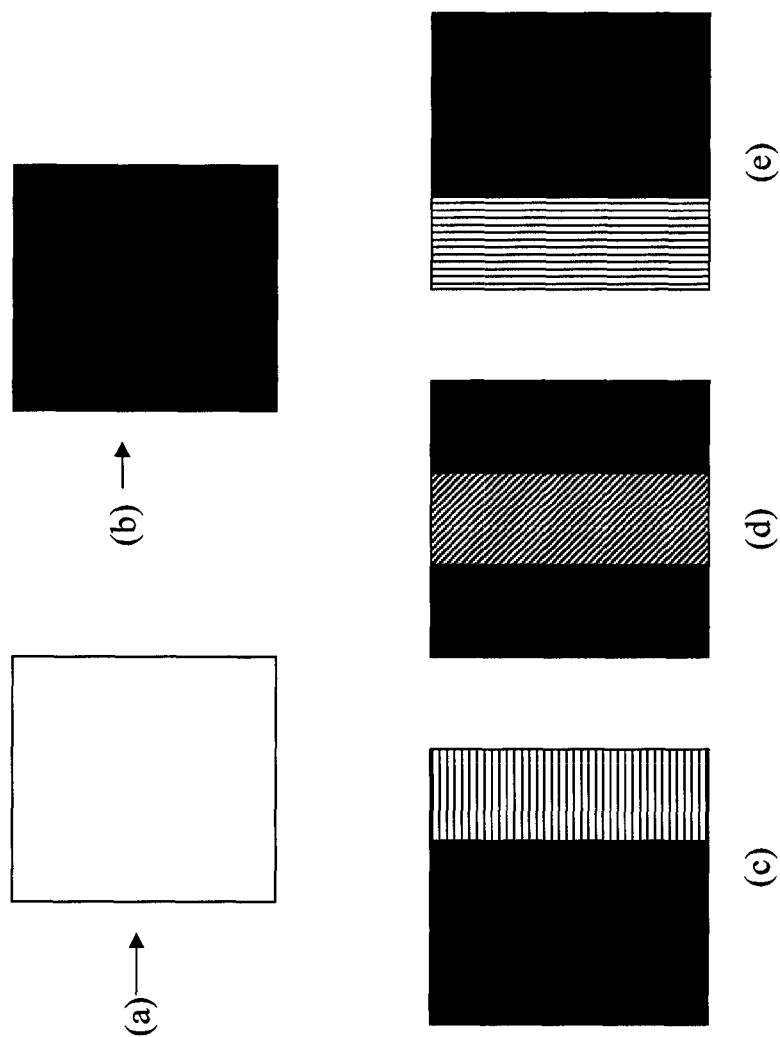
FIGS. 8a-8e are the top view showing the colors seen at the viewing side of the pixel in FIGS. 7a-7e, respectively.

In FIG. 7a, when the common electrode (703) is applied a lower voltage potential than the three pixel electrodes, the white particles would move to be near or at the common electrode while the black particles would move to be near or at the pixel electrodes. As a result, a white color state is seen at the viewing side.

In FIG. 7b, when the common electrode (703) is applied a higher voltage potential than the three pixel electrodes, the white particles would move to be near or at the pixel electrodes while the black particles would move to be near or at the common electrode. As a result, a black color state is seen at the viewing side.

In FIG. 7c, the voltages applied to the common electrode (703) and the three pixel electrodes are set at such that the white particles would move to be near or at the red and green pixel electrodes and the black particles would move to be in an area near the common electrode (703) and corresponding to the red and green pixel electrodes. As a result, the blue color is seen at the viewing side.

As stated above and also applicable to this alternative design, the color display device utilizes adjacent pixel electrodes (in this case, the red and green pixel electrodes) as collecting electrodes for the particles that need to be moved away in order to expose the desired color of a pixel electrode (in this case, the blue pixel electrode).

Similarly in FIG. 7d, the voltages applied to the common electrode (703) and the two pixel electrodes are set at such that the white particles would move to be near or at the red and blue pixel electrodes and the black particles would move to be in an area near the common electrode (703) and corresponding to the red and blue pixel electrodes. As a result, the green color is seen at the viewing side.

In FIG. 7e, the voltages applied to the common electrode (703) and the two pixel electrodes are set at such that the white particles would move to be near or at the green and blue pixel electrodes and the black particles would move to be in an area near the common electrode (703) and corresponding to the green and blue pixel electrodes. As a result, the red color is seen at the viewing side.

In FIGS. 7c-7e, the black particles are shown at the top and the white particles at the bottom. It is possible to have the white particles at the top and the black particles at the bottom. However for color saturation, it is preferred to have the black particles at the top. The intensity of the colors displayed may also be adjusted and controlled as discussed above.

FIGS. 8a-8e is the top view showing the colors seen at the viewing side of the pixel, in FIGS. 7a-7e, respectively.

Figure 9:
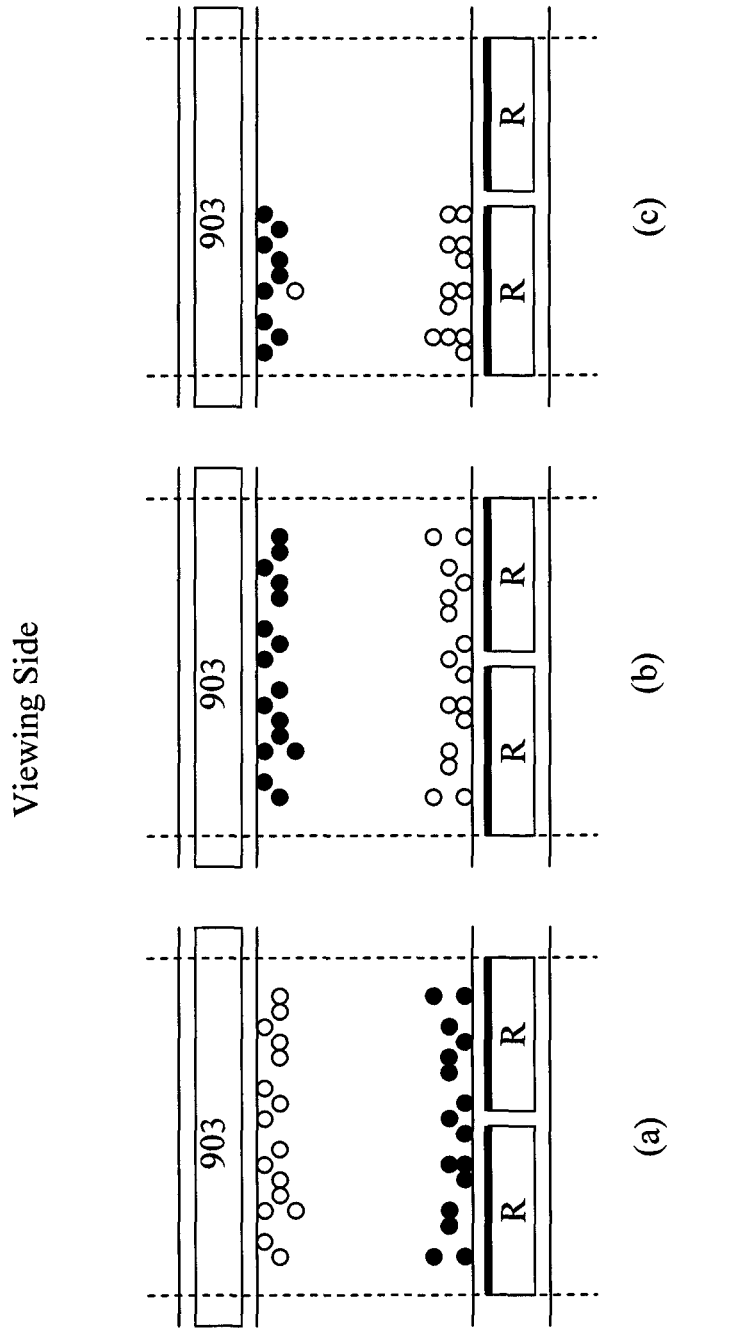
FIGS. 9a-9c illustrate how a color display of FIG. 1c may display different color states.

FIGS. 9a-9c illustrate how a highlight color display of FIG. 1c may display different color states. In FIG. 9a, a white color is seen at the viewing side. In FIG. 9b, a black color is seen at the viewing side. In FIG. 9c, a red color is seen at the viewing side.

The display device of the present invention is also capable of displaying cyan, magenta and yellow color states.

Figure 10B:
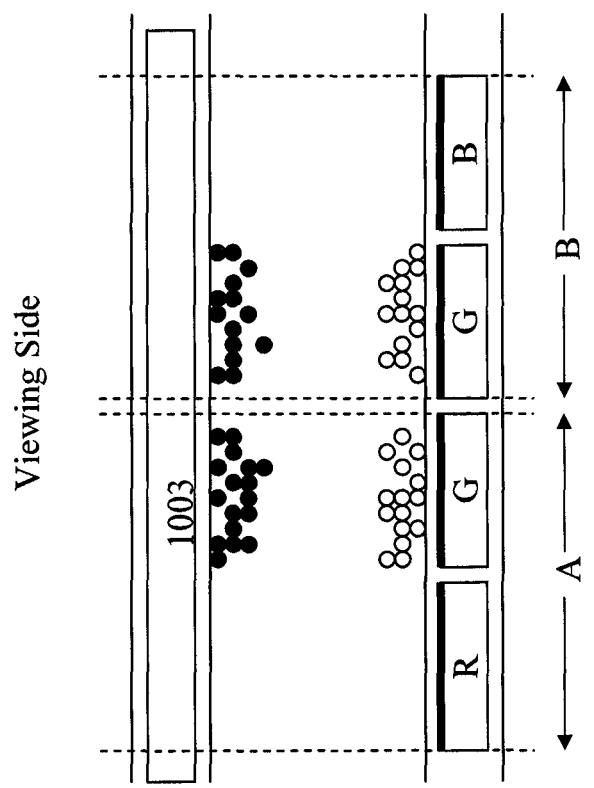

FIGS. 10a-10c show how a color display of FIG. 1a may display cyan, magenta and yellow color states.

In FIG. 10a, a cyan color is displayed while the green sub-pixel electrode is exposed in sub-pixel A and the blue sub-pixel electrodes is exposed in sub-pixel B. In this example, only one green pixel electrode is exposed which is in sub-pixel A. In practice, the exposed green pixel electrode may also be the one in sub-pixel B.

It is also possible for both green pixel electrodes to be exposed. In that case, the color will have a greener shade.

In FIG. 10b, a magenta color is displayed while the red sub-pixel electrode in sub-pixel A and the blue sub-pixel electrode in sub-pixel B are exposed.

In FIG. 10c, a yellow color is displayed when the red sub-pixel electrode in sub-pixel A and the green sub-pixel electrode in sub-pixel B are exposed. Similarly, the exposed green sub-pixel electrode can be either in sub-pixel A, sub-pixel B, or both.

Figure 11:
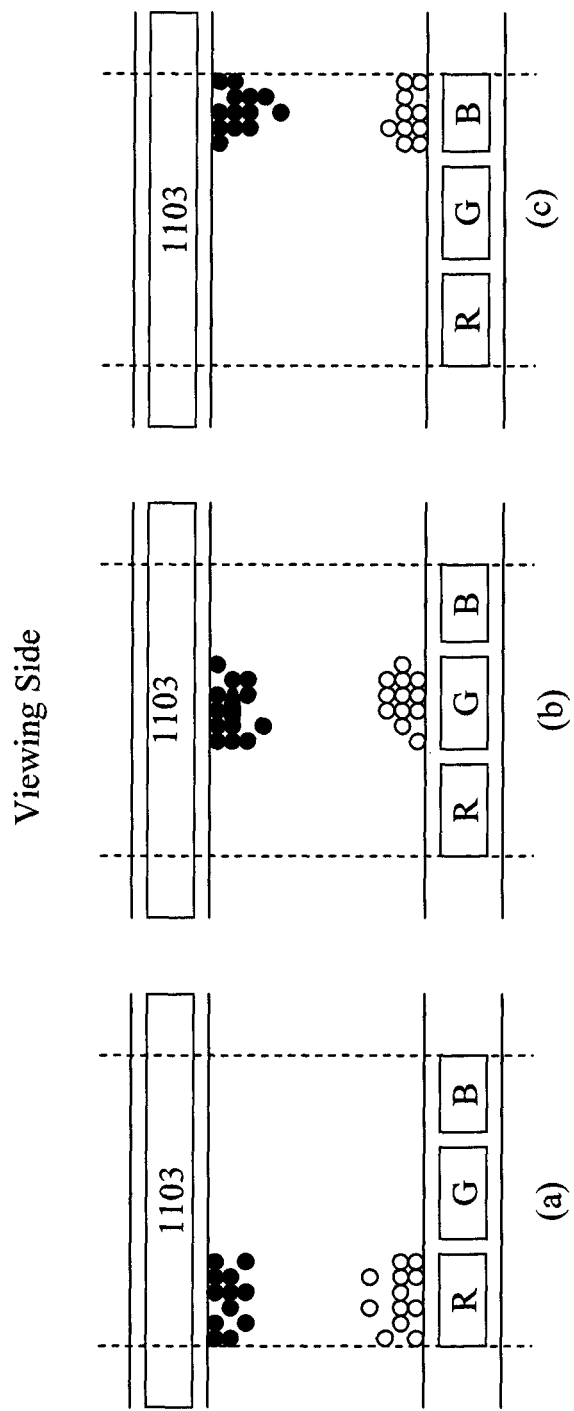
FIGS. 11a-11c illustrate how a color display of FIG. 1b may display cyan, magenta or yellow color state.

FIGS. 11a-11c illustrate how a color display of FIG. 1b may display cyan, magenta and yellow color states.

In FIG. 11a, the white particles are driven to be at or near the red pixel electrode and the black particles are driven to be in an area at or near the common electrode and corresponding to the red pixel electrode. As a result, the green and blue pixel electrodes are exposed to the viewer and a color, cyan, is seen at the viewing side.

Similarly, in FIGS. 11b, the white particles are driven to be at or near the green pixel electrode and the black particles are driven to be in an area at or near the common electrode and corresponding to the green pixel electrode. As a result, the red and blue pixel electrodes are exposed to the viewer and a color, magenta, is seen at the viewing side.

In FIG. 11c, the white particles are driven to be at or near the blue pixel electrode and the black particles are driven to be in an area at or near the common electrode and corresponding to the blue pixel electrode. As a result, the red and green pixel electrodes are exposed to the viewer and a color, yellow, is seen at the viewing side.

In order to optimize the color quality, the sizes of the sub-pixel or pixel electrodes may be adjusted.

Figure 12:
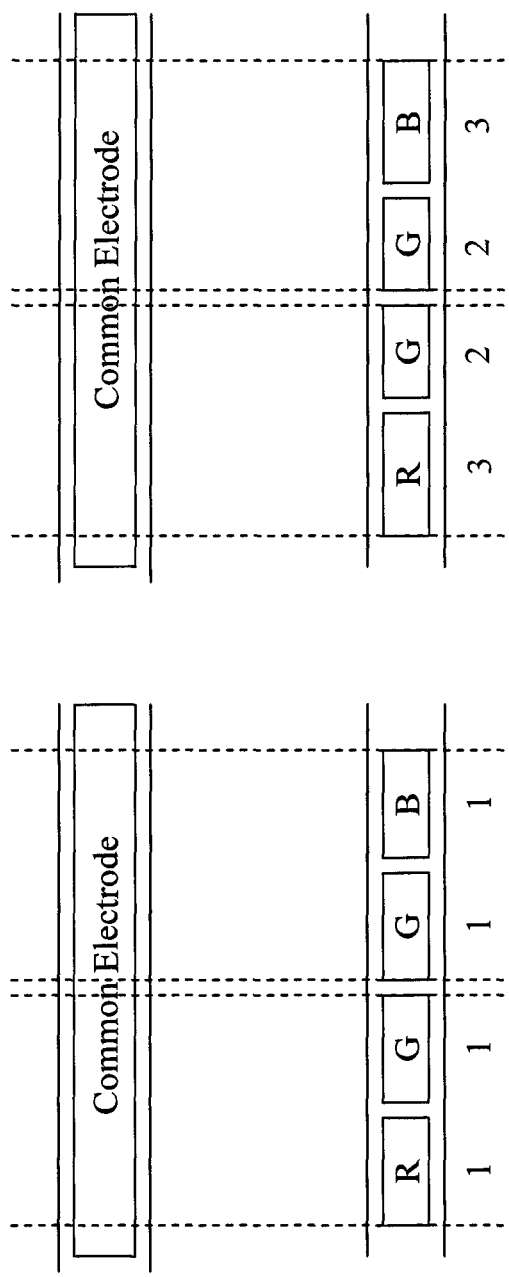
FIG. 12 illustrates how the size of the pixel electrodes may impact on color intensity.

FIG. 12 gives an example. As shown, in one figure, the four sub-pixel electrodes are of the same size. Therefore the size ratio of three colored sub-pixel electrodes, R:G:B, is 1:2:1.

In another figure as shown, the size ratio of the red sub-pixel electrode to the green sub-pixel electrode is 3:2 in sub-pixel A, and the size ratio of the green sub-pixel electrode to the blue sub-pixel electrode is 2:3 in sub-pixel B. As a result, the size ratio of the three colored pixel electrodes, R:G:B, is 3:4:3.

In this example, the green color would be brighter in the pixel in which the size ratio of the three colors is 1:2:1 because the relative total area of the green sub-pixel electrodes is larger. Accordingly, the sizes of the sub-pixel or pixel electrodes may be adjusted to give different levels of color intensity. The discussion in this section is relevant to not only the sub-pixel or pixel electrodes of regular shapes; but also the sub-pixel or pixel electrodes of irregular shapes.

As stated, the sizes of the display cells and the pixel electrodes on a backplane, according to the present invention, do not have to be exactly matched. More importantly, the display cells also do not have to be aligned with the pixel electrodes, location wise.

The term "display cell" refers to a micro-container filled with a display fluid. A display cell may be a microcup as described in U.S. Pat. No. 6,930,818, the content of which is incorporated herein by reference in its entirety.

A display cell may also be any other micro-containers (e.g., microcapsules or microchannels), regardless of their shapes or sizes. All of these are within the scope of the present application, as long as the micro-containers are filled with a display fluid and have the same functions as the microcups.

Figure 13:
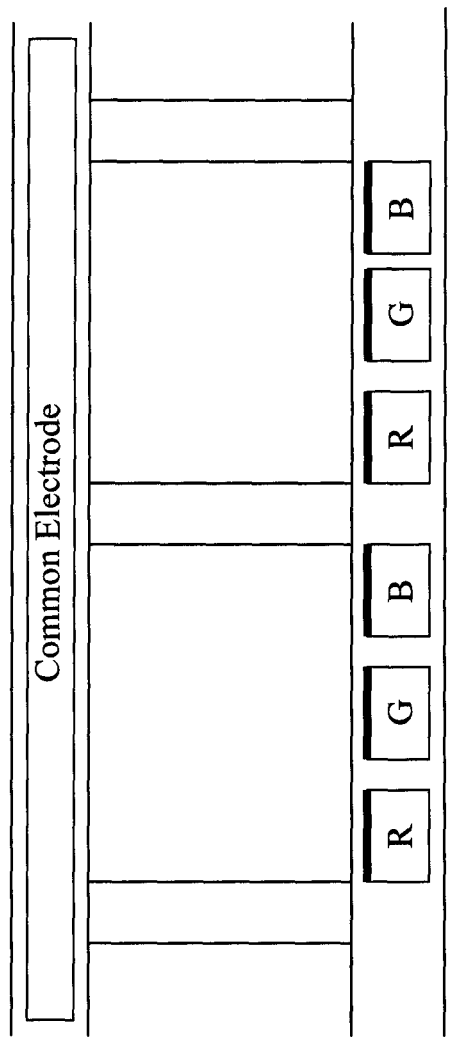
FIGS. 13 and 14 show an aligned design and an un-aligned design, respectively.
Figure 14:
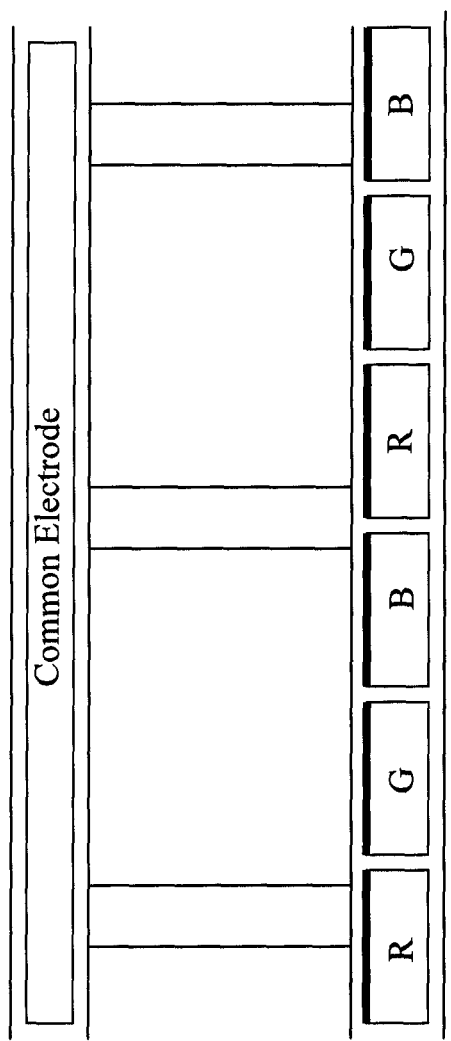

FIGS. 13 and 14 show an aligned design and an un-aligned design respectively.

In an aligned type, each set of sub-pixel or pixel electrodes are within the boundary of display cells. For the microcup-type of display cells, the boundary of a display cell is the partition walls surrounding the display cell. For the micro-capsule-type of display cells, the boundary of a display cell is the polymeric matrix material in which the microcapsules are embedded.

Figure 15:
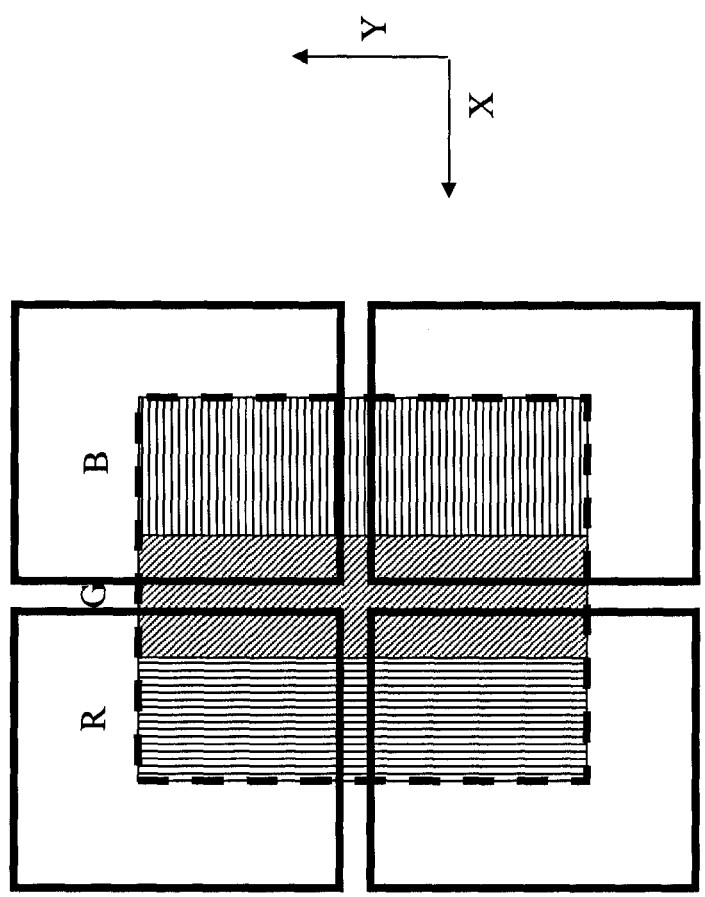
FIG. 15 depicts an unaligned design, in a top view.

FIG. 15 shows an unaligned design, in a top view. In this example, each pixel (marked by dotted line) has three colored pixel electrodes, red, green and blue. The display cells are not aligned with the pixel electrodes. However, the X/Y axes of the display cells are aligned with the X/Y axes of the pixel electrodes.

FIGS. 16a-16e show how such an unaligned design may display different color states.

Figures 1, 16:
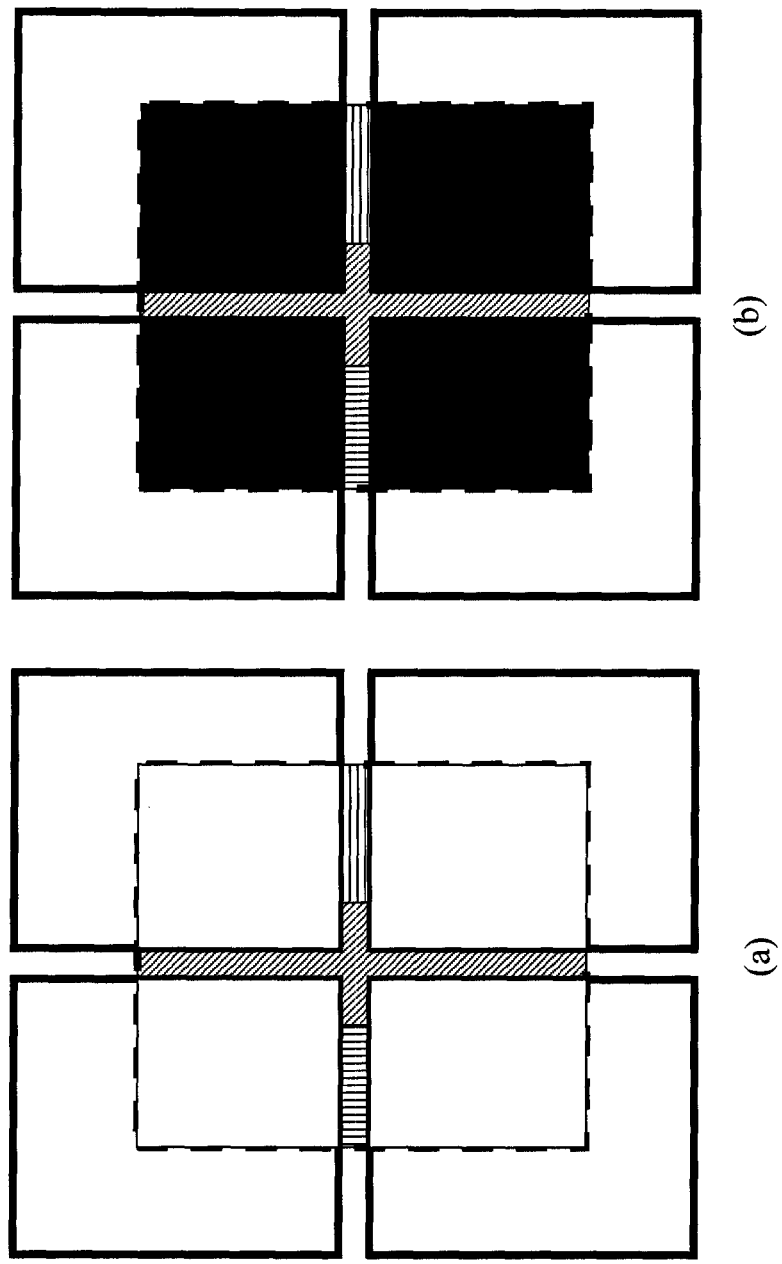
Figures 2, 16:
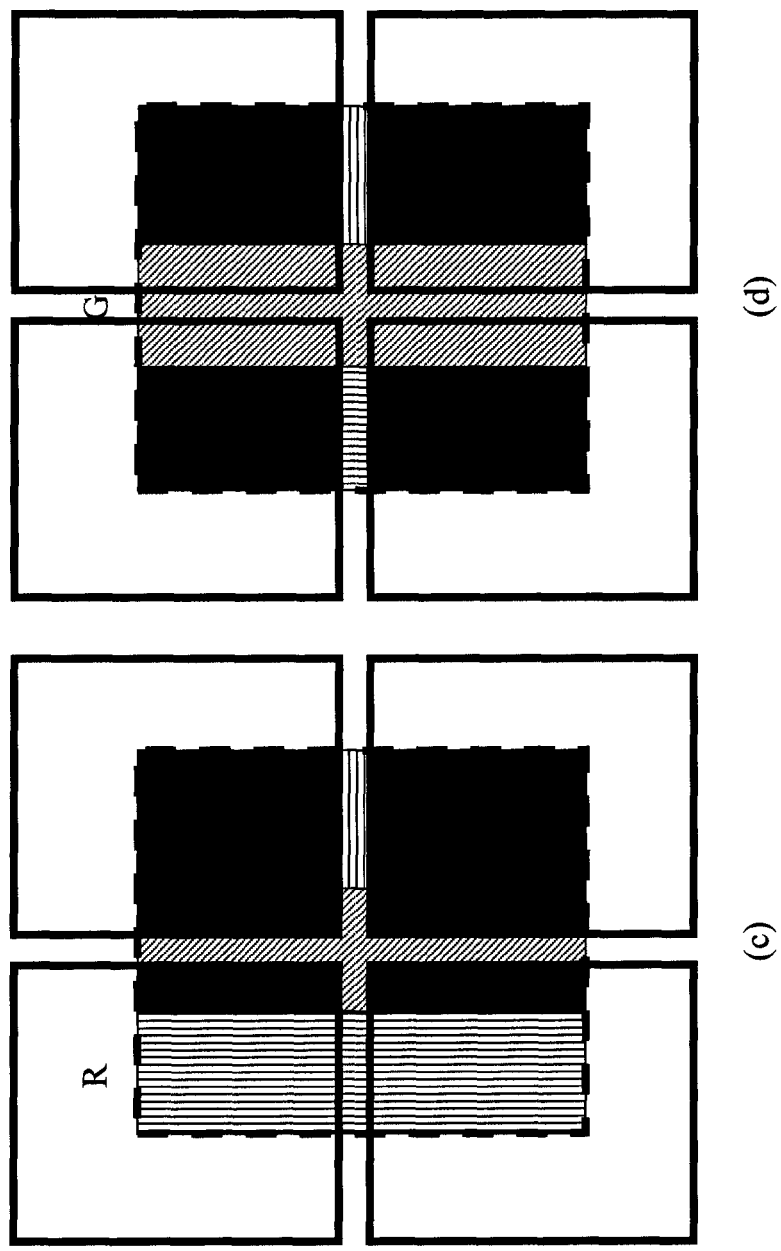
Figures 3, 16:
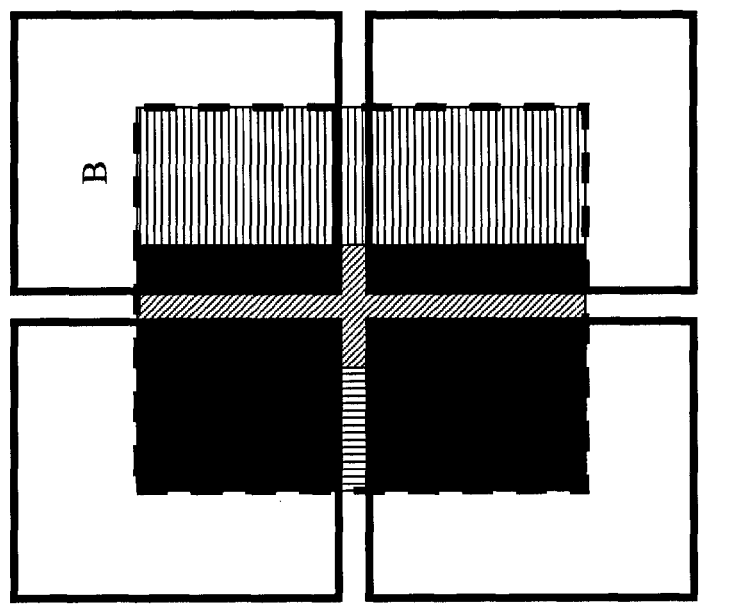

In FIGS. 16a and 16b, a pixel of the white color state or the black color state is seen, respectively. In FIG. 16c, a pixel of the red color state is seen as only the red pixel electrode is exposed. In FIG. 16d, a pixel of the green color is seen because only the green pixel electrode is exposed. In FIG. 16e, a pixel of the blue color is seen as only the blue pixel electrode is exposed.

Figure 17:
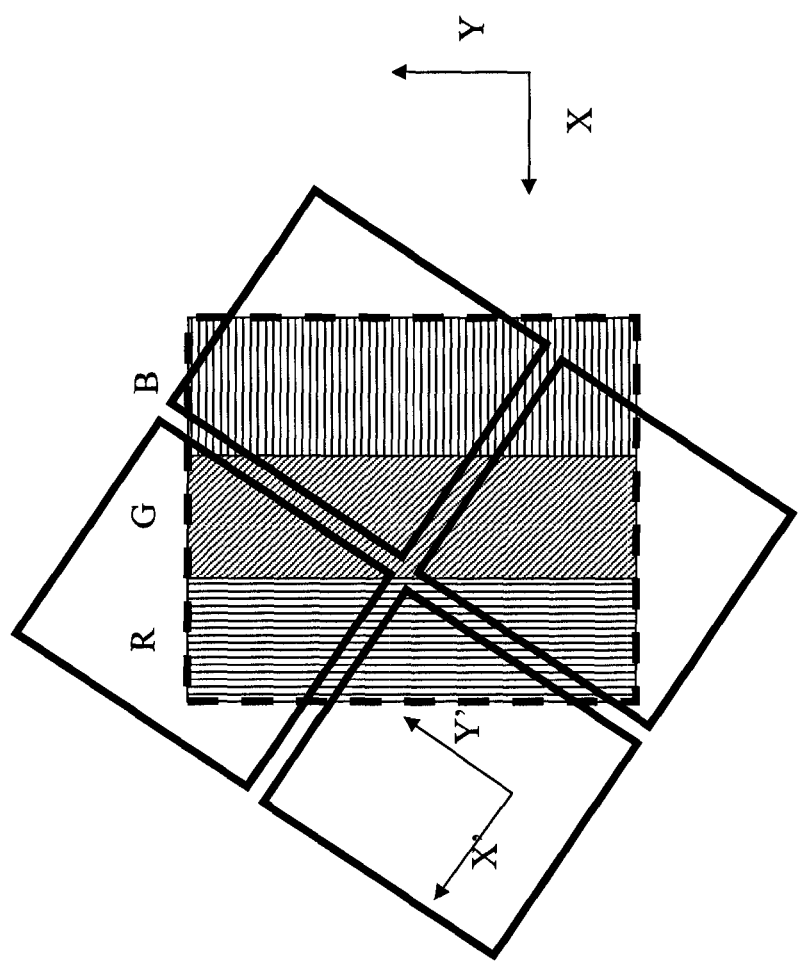
FIG. 17 depicts an alternative unaligned design, in a top view.

FIG. 17 shows an alternative unaligned design, also in a top view. In this example, not only the display cells and the pixel electrodes are not aligned, the X'/Y' axes of display cells and the X/Y axes of the pixel electrodes are also not aligned.

It is shown in FIGS. 15 and 17 that the partition walls of the display cells are transparent. Therefore the colors of the pixel electrodes are seen through the partition walls. It is also possible for the partition walls to be non-transparent.

Figures 1, 18:
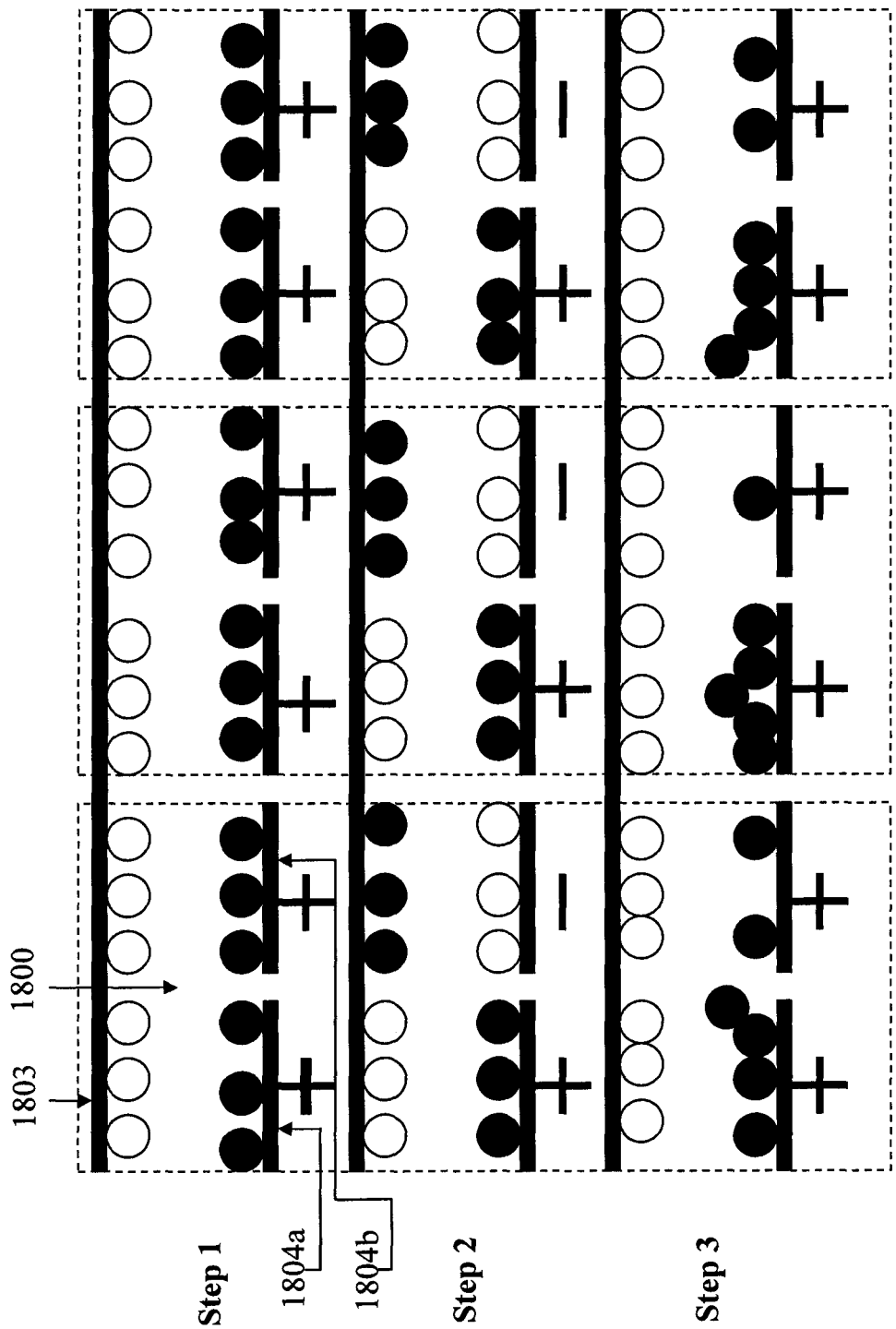
FIG. 18 is an example of driving steps for a color display of the present invention.
Figures 2, 18:
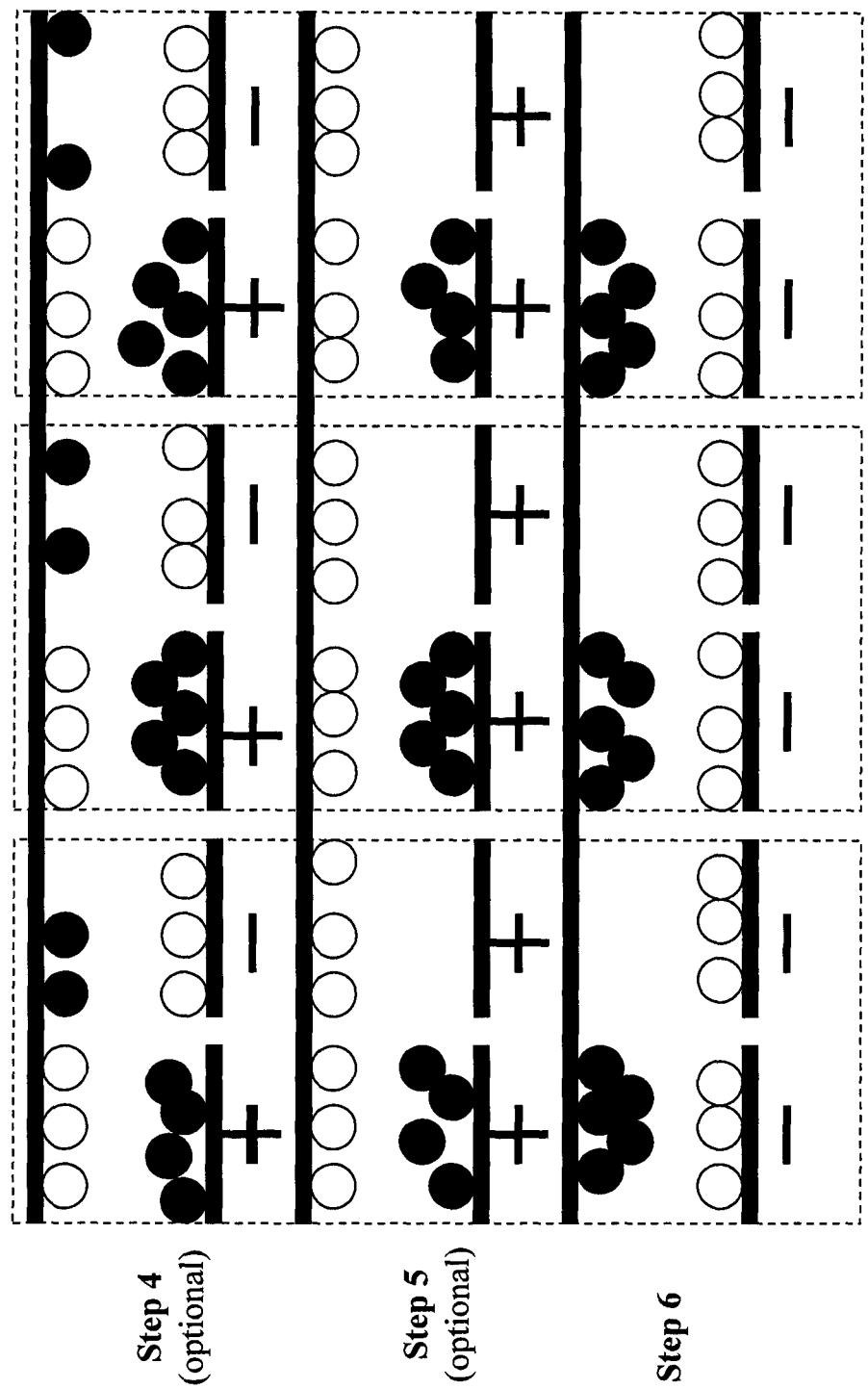
Figures 3, 18:
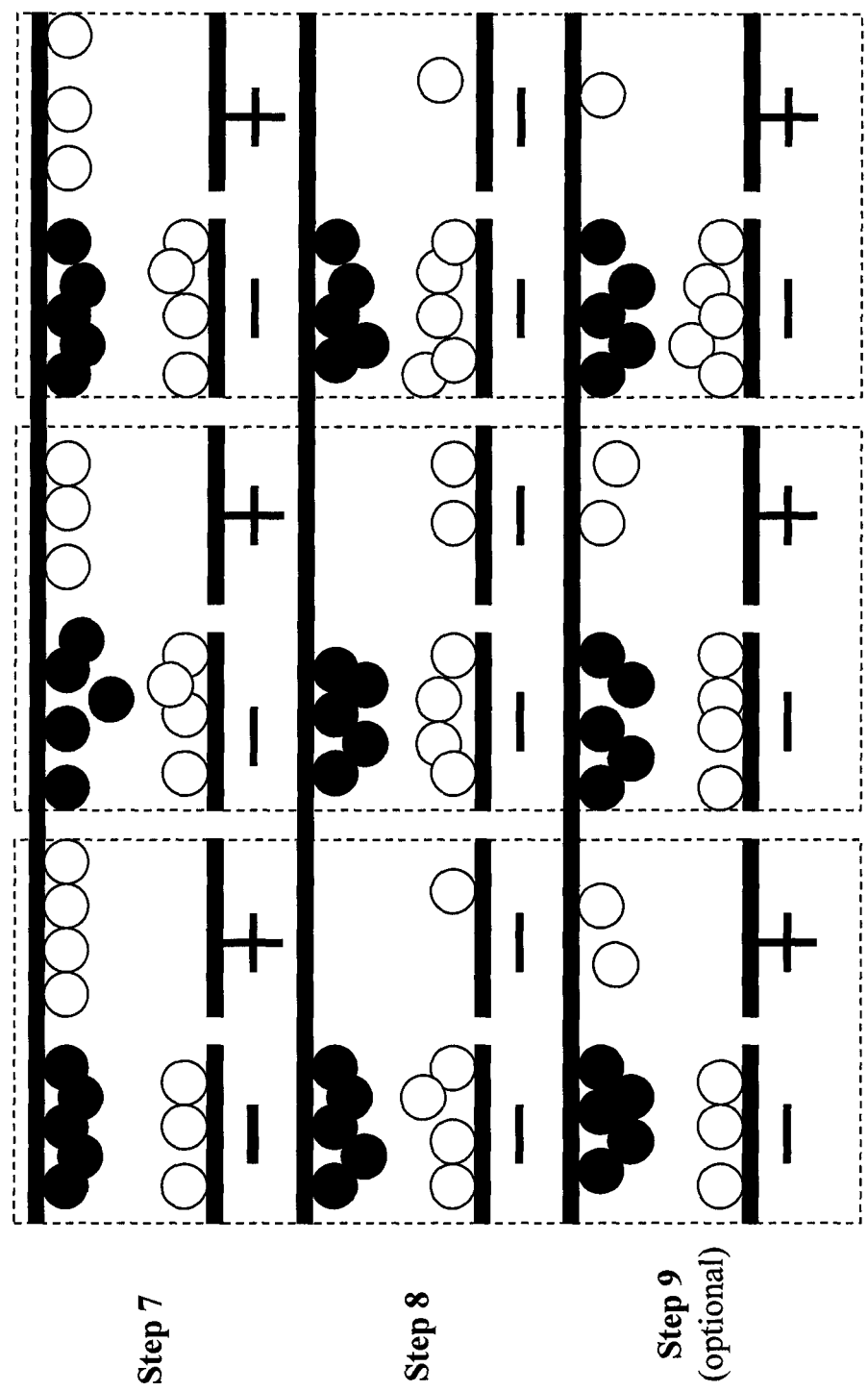
Figures 4, 18:
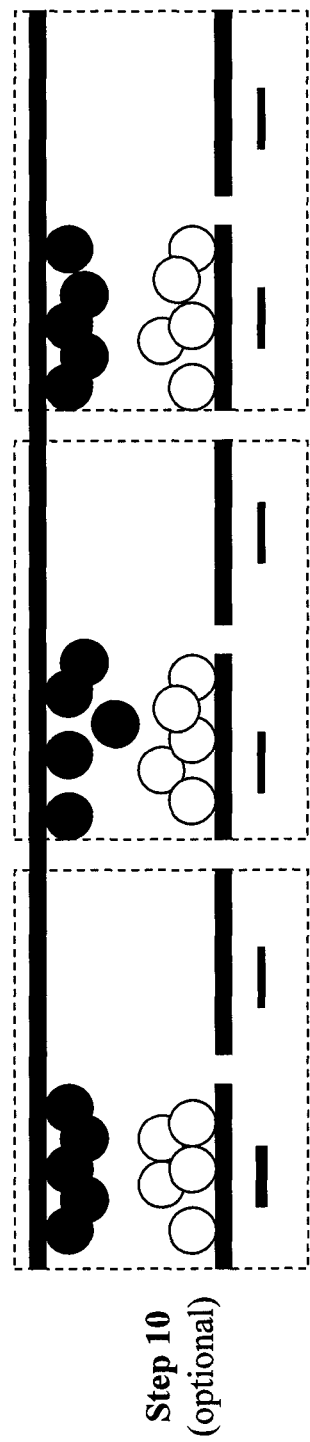

FIG. 18 illustrates an example of driving steps for a color display of the present invention, which demonstrates how the present color display may be implemented.

Since the movement of particles follows the electric field lines and because the electric field lines are normal to the surface of the common electrode, all the lateral movement of the particles is in the lower part of a sub-pixel or pixel (near the pixel electrodes) where there are divergent electric field lines.

The particles are held with a driving voltage during driving and therefore they do not rely on bistability during that time.

As shown in FIG. 18, each sub-pixel (1800) is sandwiched between a common electrode (1803) and a pair of sub-pixel electrodes (1804a and 1804b).

In this example, the target is to expose the color layer on sub-pixel electrode 1804b by moving the particles to sub-pixel electrode 1804a.

The common electrode is set at 0V.

During driving, the common electrode and one sub-pixel electrode (1804a) remain at a constant driving voltage to hold the particles in place at sub-pixel electrode (1804a) while sub-pixel electrode (1804b) is switched back and forth between a positive driving voltage and a negative driving voltage so that the particles are caught in the fringing field during transit and therefore are moved laterally to sub-pixel electrode (1804a).

For brevity, sub-pixel electrode 1804a is the sub-pixel electrode where the pigment particles will gather, which therefore may also be referred to as a "collecting electrode" and sub-pixel electrode 1804b is the sub-pixel electrode which will be exposed and therefore it may also be referred to as a "shutter electrode".

In step 1 (the initiation step), the white particles are at or near the common electrode (1803) while the black particles are at or near the sub-pixel electrodes (1804a and 1804b).

In step 2, the black and white particles switch positions between the common electrode and the sub-pixel electrode ("shutter electrode")(1804b).

In step 3, the black and white particles switching positions again between the common electrode and the "shutter electrode" (1804b) and some of the black particles are driven to sub-pixel electrode ("collecting electrode")(1804a).

Steps 4 and 5 are optional steps which are repetition of steps 2 and 3 respectively. These two steps may be repeated many times, if necessary.

In step 6, the applied driving voltages are reversed, causing the black and white particles at the end of step 3 (or 5) to switch positions.

In step 7, the white particles at the "shutter electrode"1804b are driven to the common electrode and at the same time, some of the white particles are driven to the "collecting electrode" 1804a.

In step 8, the white particles at the common electrode are driven to the "collecting electrode" 1804a and at the same time, some of the white particles are driven to the "shutter electrode" 1804b.

Steps 9 and 10 are optional steps which are repetition of steps 7 and 8, respectively. If the driving is complete at the end of step 8, then steps 9 and 10 are not needed. Step 10 in the figure shows that the particles have been moved to sub-pixel electrode 1804a to expose the color state of sub-pixel electrode 1804b.

In summary, the driving method comprises:

a) applying a constant driving voltage between the common electrode and the collecting electrode; and b) applying alternating positive driving voltage and negative driving voltage between the common electrode and the shutter electrode.

Following the method as described, for the color display exemplified in FIG. 4c, pixel A, a constant driving voltage is applied between the common electrode and the collecting electrode (i.e., the green sub-pixel electrode) and alternating positive driving voltage and negative driving voltage are applied between the common electrode and the shutter electrode (i.e., the red sub-pixel electrode).

In some cases, there are more than one collecting electrode (see, for example, FIGS. 7c-7e) and in some cases, there are more than one shutter electrode (see, for example, FIGS. 11a-11c).

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A color display comprising
 i) an electrophoretic fluid comprising black and white particles carrying opposite charge polarities dispersed in a clear and colorless solvent, and
 ii) a plurality of pixels; wherein:
 a) each of said pixels comprises two sub-pixels,
 b) each of said sub-pixels is sandwiched between a common electrode on a viewing side and at least two colored sub-pixel electrodes,
 c) among the sub-pixel electrodes at least one is red, one is green and one is blue, and
 d) each of said pixels displays white color by moving the white particles to be near or at the common electrode, displays black color by moving the black particles to be near or at the common electrode, displays red color by moving the black and white particles away to expose the red sub-pixel electrode, displays green color by moving the black and white particles away to expose the green sub-pixel electrode and displays blue color by moving the black and white particles away to expose the blue sub-pixel electrode.

2. The display of claim 1, wherein the sub-pixel electrodes are rectangular or square in shape.

3. The display of claim 1, wherein the sub-pixel electrodes are of an irregular shape.

4. The play of claim 1, wherein the sub-pixel electrodes are coated with a colored layer.

5. The display of claim 1, wherein the sub-pixel electrodes are on a thin film transistor backplane.

6. The display of claim 1, wherein said electrophoretic fluid is contained within individual display cells.

7. The display of claim 6, wherein the display cells are microcups.

8. The display of claim 6, wherein the display cells are microcapsules.

9. The display of claim 6, wherein the display cells and the sub-pixel electrodes are aligned.

10. The display of claim 1, wherein the display cells and the sub-pixel electrodes are unaligned.

11. play of claim 1, which comprises more than four sub-pixel electrodes in a pixel.

* * * * *